US011182820B2

(12) United States Patent
Custer et al.

(10) Patent No.: US 11,182,820 B2
(45) Date of Patent: Nov. 23, 2021

(54) SYSTEM AND METHOD FOR ELECTRONIC SUBMISSION OF A REBATE REQUEST WITH VALIDATION INFORMATION

(71) Applicant: T-Mobile USA, Inc., Bellevue, WA (US)

(72) Inventors: Joseph Custer, Minneapolis, MN (US); Baris Seker, Eden Prairie, MN (US)

(73) Assignee: T-Mobile USA Inc., Bellevue, WA (US)

( * ) Notice: Subject to any disclaimer, the term of this patent is extended or adjusted under 35 U.S.C. 154(b) by 0 days.

(21) Appl. No.: 13/770,363

(22) Filed: Feb. 19, 2013

(65) Prior Publication Data
US 2013/0173376 A1 Jul. 4, 2013

Related U.S. Application Data

(63) Continuation-in-part of application No. 13/690,998, filed on Nov. 30, 2012, now abandoned.

(60) Provisional application No. 61/566,361, filed on Dec. 2, 2011.

(51) Int. Cl.
G06Q 30/02 (2012.01)
(52) U.S. Cl.
CPC .................. G06Q 30/0234 (2013.01)
(58) Field of Classification Search
CPC ........... G06Q 30/0235; G06Q 30/0257; G06Q 30/0611
See application file for complete search history.

(56) References Cited

U.S. PATENT DOCUMENTS

| 4,723,212 A | 2/1988 | Mindrum et al. |
| 4,882,675 A | 11/1989 | Nichtberger et al. |
| 4,896,791 A | 1/1990 | Smith |
| 4,949,256 A | 8/1990 | Humble |
| 5,056,019 A | 10/1991 | Schultz et al. |
| 5,173,851 A | 12/1992 | Off et al. |
| 5,176,224 A | 1/1993 | Spector |

(Continued)

FOREIGN PATENT DOCUMENTS

| WO | 9404979 | 3/1994 |
| WO | 2011063177 | 5/2011 |

OTHER PUBLICATIONS

Margulies, ED. "236 Killer Voice Processing Applications" Flatiron Publishing, Inc., Jul. 1995 (pp. 7-50-7-53).

(Continued)

Primary Examiner — Rashida R Shorter
(74) Attorney, Agent, or Firm — Perkins Coie LLP

(57) ABSTRACT

The present disclosure relates to a system for rebate claim submission including an interface module configured for downloading to an electronic mobile device as a mobile app and configured for display on a display screen of the mobile device, the interface module also configured for displaying a rebate offer available for selection to a consumer of the mobile device, identifying a selection of a displayed rebate offer based on the consumer's electronic input, and providing a camera function through which the consumer may photograph proof of purchase data, wherein the proof of purchase data indicates purchase of one or more rebate qualifying products or services. The present disclosure also relates to a method for receiving a rebate claim via an electronic mobile device via a mobile app.

19 Claims, 14 Drawing Sheets

(56) References Cited

U.S. PATENT DOCUMENTS

| | | |
|---|---|---|
| 5,200,889 A | 4/1993 | Mori |
| 5,202,826 A | 4/1993 | McCarthy |
| 5,256,863 A | 10/1993 | Ferguson et al. |
| 5,287,268 A | 2/1994 | McCarthy |
| 5,305,197 A | 4/1994 | Axler et al. |
| RE34,915 E | 4/1995 | Nichtberger et al. |
| 5,467,269 A | 11/1995 | Flaten |
| 5,483,049 A | 1/1996 | Schulze, Jr. |
| 5,502,636 A | 3/1996 | Clarke |
| 5,581,064 A | 12/1996 | Riley et al. |
| 5,665,953 A | 9/1997 | Mazzamuto et al. |
| 5,697,844 A | 12/1997 | Von Kohorn |
| 5,710,886 A | 1/1998 | Christensen et al. |
| 5,729,693 A | 3/1998 | Holda-Fleck |
| 5,761,648 A | 6/1998 | Golden et al. |
| 5,774,870 A | 6/1998 | Storey |
| 5,791,991 A | 8/1998 | Small |
| 5,806,043 A | 9/1998 | Toader |
| 5,822,735 A | 10/1998 | De Lapa et al. |
| 5,855,007 A | 12/1998 | Jovicic et al. |
| 5,892,827 A | 4/1999 | Beach et al. |
| 5,905,246 A | 5/1999 | Fajkowski |
| 5,907,830 A | 5/1999 | Engel et al. |
| 5,923,016 A | 7/1999 | Fredregill et al. |
| 5,924,078 A | 7/1999 | Naftzger |
| 5,924,080 A | 7/1999 | Johnson |
| 5,945,653 A | 8/1999 | Walker et al. |
| 5,983,196 A | 11/1999 | Wendkos |
| 6,035,280 A | 3/2000 | Christensen |
| 6,039,244 A | 3/2000 | Finsterwald |
| 6,049,778 A | 4/2000 | Walker et al. |
| 6,068,183 A | 5/2000 | Freeman et al. |
| 6,138,911 A | 10/2000 | Fredregill et al. |
| 6,173,267 B1 | 1/2001 | Cairns |
| 6,278,980 B1 | 8/2001 | Wendkos |
| 6,328,339 B2 | 12/2001 | Dixon, III et al. |
| 6,336,098 B1 | 1/2002 | Fortenberry et al. |
| 6,450,407 B1 | 9/2002 | Freeman et al. |
| 6,697,785 B2 | 2/2004 | Dixon, III et al. |
| 6,741,968 B2 | 5/2004 | Jacoves et al. |
| 6,748,365 B1 | 6/2004 | Quinlan et al. |
| 6,847,935 B1 | 1/2005 | Solomon et al. |
| 6,865,544 B1 | 3/2005 | Austin |
| 6,874,935 B2 | 4/2005 | Edelman et al. |
| 6,915,271 B1 | 7/2005 | Meyer et al. |
| 6,932,270 B1 | 8/2005 | Fajkowski |
| 7,120,591 B1 | 10/2006 | Solomon et al. |
| 7,146,328 B1 | 12/2006 | Solomon et al. |
| 7,305,129 B2 | 12/2007 | Chellapilla et al. |
| 7,493,268 B2 | 2/2009 | Kepros |
| 7,668,749 B2 | 2/2010 | Kepros |
| 8,149,810 B1 | 4/2012 | Segura |
| 8,639,571 B1 | 1/2014 | Leason et al. |
| 2002/0103834 A1 | 8/2002 | Thompson et al. |
| 2002/0152118 A1 | 10/2002 | Hadjigeorgis |
| 2004/0181749 A1 | 9/2004 | Chellapilla et al. |
| 2004/0210481 A1* | 10/2004 | Quinlan ............... G06Q 20/387 705/14.13 |
| 2004/0251305 A1* | 12/2004 | Klapka ................. G06Q 30/02 235/383 |
| 2006/0100011 A1 | 5/2006 | Morrow et al. |
| 2008/0028473 A1 | 1/2008 | Cehelnik |
| 2008/0154715 A1 | 6/2008 | Galinos |
| 2008/0154722 A1 | 6/2008 | Galinos |
| 2009/0037281 A1* | 2/2009 | Devlin ............... G06Q 30/0239 705/14.14 |
| 2009/0259538 A1* | 10/2009 | Miller et al. .................... 705/14 |
| 2010/0211449 A1 | 8/2010 | Nelson |
| 2011/0125561 A1* | 5/2011 | Marcus ............. G06Q 30/0225 705/14.15 |
| 2011/0161154 A1 | 6/2011 | McLaughlin et al. |
| 2012/0084135 A1* | 4/2012 | Nissan ................... G06Q 30/06 705/14.38 |
| 2012/0185318 A1 | 7/2012 | Shipley |
| 2012/0246004 A1* | 9/2012 | Book ..................... G06Q 30/02 705/14.58 |
| 2012/0246015 A1 | 9/2012 | Bennett et al. |
| 2012/0296719 A1 | 11/2012 | Pearson et al. |
| 2013/0066698 A1* | 3/2013 | Levy et al. ................. 705/14.17 |
| 2013/0110607 A1* | 5/2013 | Basmajian et al. ........ 705/14.26 |

OTHER PUBLICATIONS

"Catalina Marketing's Checkout Rebate Offers Simple Solutions to Traditional Rebate Programs" PR Newswire, Feb. 24, 1998 (2 pp.).
Peppers, Don et al. "The One to One Future" Currency Doubleday, 1993 (pp. 95-123, 152-153).
Miscellaneous rebate forms, with the the most recent dated Feb. 1, 2000 (30 pp.).
International Application Serial No. PCT/US10/57331, Search Report and Written Opinion dated Apr. 19, 2011.

* cited by examiner

FIG. 4

FIG 5

SYSTEM AND METHOD FOR ELECTRONIC SUBMISSION OF A REBATE REQUEST WITH VALIDATION INFORMATION

CROSS-REFERENCE TO RELATED APPLICATIONS

This application is a continuation-in-part of U.S. application Ser. No. 13/690,998, filed Nov. 30, 2012, which claims priority to U.S. Provisional Application No. 61/566,361, filed Dec. 2, 2011, which are hereby incorporated herein by reference in their entirety.

FIELD OF THE DISCLOSURE

The present disclosure relates to rebate redemption and fulfillment, such as for traditional product marketing rebates. Particularly, the present disclosure relates to the rebate redemption and fulfillment, including the electronic or digital submission of a consumer rebate request having appropriate validation information included therewith.

BACKGROUND OF THE DISCLOSURE

Commercial businesses are constantly looking for new ways to retain and/or increase client base. Product marketing rebates are well-known to most consumers and have been used by manufacturers as a tool for promoting and selling products by providing customers with an incentive to purchase particular products, sometimes during a specific period. Typically, in a rebate system, a consumer will purchase a product and subsequently mail in a rebate claim for that product along with identifying information, such as the consumer's name, address, telephone number, e-mail address, etc. This criteria typically includes filling out a specific rebate form with the name and address of the consumer, enclosing a point of sale or cash register receipt identifying where and when the item was purchased, and often enclosing the Universal Product Code (UPC) or other designated portion of the product packaging proving actual purchase of the product. After some period of time, typically after validation of the rebate information submitted by the consumer, the manufacturer or a rebate fulfillment or processing center contracted by the manufacturer to administer the rebate program may transfer the value of the rebate to the consumer, such as by sending a check, pre-paid card, or the like in the mail.

This process of rebate redemption can be time consuming for the consumer, generally requiring the consumer to keep track of receipts and UPCs for each product, fill out one or more rebate forms, mail each form to a manufacturer or rebate processing center, and cash each check that is sent back by the manufacturer or rebate processing center. Accordingly, due to the work required to take advantage of rebates, many consumers may be frustrated by the process and opt not to participate in the rebate program. The purchasing decisions of such reluctant consumers may thus be uninfluenced by rebate offers.

Some rebate programs have more recently provided the ability to submit a rebate claim through electronic means, such as via a website on the internet. Such rebate programs may allow a user to submit consumer identifying information, such as the consumer's name, address, telephone number, e-mail address, etc. electronically over the internet. However, some rebate programs of this type still require that the consumer mail in proof of purchase information, such as a point-of-sale or cash register receipt and/or UPC for the product, in order to validate the rebate claim. Thus, the disadvantages discussed above relating to the amount of work required to take advantage of rebate programs are not solved by such electronic claim submission rebate programs.

Further electronic claim submission rebate programs have addressed the issue of requiring the consumer to mail in proof of purchase data by validating the rebate using information received from a point-of-sale data processing and storage system. In such systems, upon completion of a qualifying purchase, a transaction may be recorded by a point-of-sale data processing and storage system. The merchant offering the rebate, or a rebate processing center contracted by the merchant, may subsequently receive reports, often electronically, from the point-of-sale data processing and storage systems comprising a plurality of purchase data records, e.g., information relating to the sales transactions for the merchant. In addition to, or alternative to, the consumer's proof of purchase data, these reports from the point-of-sale data processing and storage system may be used to validate a consumer's rebate claim. However, such rebate programs require a communication link with the point-of-sale data processing and storage systems, and the point-of-sale data processing and storage systems must be set up to provide such information. Such requirements add additional overall cost to the rebate programs.

Accordingly, there is a need for a system and method for more convenient and efficient rebate redemption and fulfillment. Particularly, there is a need for a system and method for more convenient and efficient rebate redemption and fulfillment, including the electronic or digital submission of a consumer rebate request having appropriate validation information included therewith. Furthermore, there is a need in the art for a system and method for rebate redemption and fulfillment where relatively accurate and efficient validation may be done by, for example, a rebate processing center without a communication link with the merchant or point-of-sale data processing systems and without overburdening consumers by subsequent mailing of proof of purchase information.

BRIEF SUMMARY OF THE DISCLOSURE

The present disclosure, in one embodiment, relates to a system for rebate claim submission. The system includes an interface module for display on a display screen. The interface module may be configured for receiving consumer identifying information based on a consumer's electronic input and receiving an uploaded digital copy of physical proof of purchase data, the purchase data indicating purchase of one or more rebate qualifying products or services. Although not required, in some embodiments, the purchase data may indicate the purchase of a plurality of products or services in a single sales transaction. Among other things, the consumer information may include the consumer's name, physical address, and/or email address. The proof of purchase data, in many embodiments, may be a point-of-sale receipt while in other embodiments, the proof of purchase data may include a Universal Product Code (UPC) for each of the rebate qualifying products. Typically, the interface module will be accessible over a network via a uniform resource locator (URL) or the like. The interface module may also be configured for providing a plurality of rebate fulfillment options available for selection by the consumer. Such rebate fulfillment options may include, for example, a mailed rebate or an electronic rebate.

The present disclosure, in another embodiment, relates to a method for receiving a rebate claim. The method may include providing an interface module for display on a display screen, receiving, via the interface module, consumer identifying information, and receiving, via the interface module, an uploaded digital copy of physical proof of purchase data, the purchase data indicating purchase of one or more rebate qualifying products or services. In some embodiments, as stated above, the purchase data may indicate the purchase of a plurality of products or services in a single sales transaction. The consumer information may include, among other things, the consumer's name, physical address, and/or email address, and the proof of purchase data may include a point-of-sale receipt or a UPC for each of the rebate qualifying products. The method may further include providing a plurality of rebate fulfillment options available for selection by the consumer. Such rebate fulfillment options may include receiving a mailed rebate or an electronic rebate. The method may also include validating the rebate based on at least one of the consumer identifying information and the uploaded digital copy of physical proof of purchase data. Image processing hardware and/or software may be used to automatically validate the rebate based on the uploaded digital copy of physical proof of purchase. In further embodiments, the rebate may be validated based on at least one indicator, the indicator being a subset of data obtained from the consumer identifying information and/or the uploaded digital copy of physical proof of purchase data. In many embodiments, the rebate value may be sent to the consumer in the form of a prepaid rebate card or an electronic rebate. In one embodiment, the electronic rebate may be a rebate value uploaded to a predetermined consumer value account, such as but not limited to a bank account, debit card account, or reloadable card account.

The present disclosure, in a further embodiment, relates to a system for rebate claim submission. The system may include an interface module configured for downloading to an electronic mobile device as a mobile app and configured for display on a display screen of the electronic mobile device. The interface module may also be configured for displaying a rebate offer available for selection to a consumer of the electronic mobile device, identifying a selection of a displayed rebate offer based on the consumer's electronic input, and providing a camera function through which the consumer may photograph proof of purchase data, the proof of purchase data indicating purchase of one or more rebate qualifying products or services. The proof of purchase data, in some instances, may indicate purchase of a plurality of products or services, which in even further instances, may be from a single sales transaction. The interface module may also be configured for, at least once, receiving consumer identifying information from the consumer. In further embodiments, the interface module may store the consumer identifying information for subsequent use, so as to conveniently avoid requiring the consumer to reenter the consumer identifying information for each rebate claim submission. The consumer information may include a consumer's name, physical address, and/or email address, among other information. In certain embodiments, the proof of purchase data may include a point-of-sale receipt. The proof of purchase data may alternatively or additionally include a UPC for each of one or more rebate qualifying products. In some embodiments, the interface module may be further configured for providing a plurality of rebate fulfillment options available for selection by the consumer; such rebate fulfillment options may, for example, include receiving a mailed rebate or receiving an electronic rebate. In additional embodiments, the interface module may be configured for validating rebate claim submissions from the consumer based, at least in part, on the consumer identifying information and/or the proof of purchase data, while in other embodiments, the interface module may be configured for transmitting rebate claim submissions via a network to a rebate processing center for validating the rebate claim submissions based, at least in part, on the consumer identifying information and/or the proof of purchase data. In either embodiment, the interface module may be further configured for providing the consumer with an electronic rebate upon validation of a rebate claim submission.

The present disclosure, in still another embodiment, relates to a method for receiving a rebate claim. The method may include providing an interface module configured for downloading to an electronic mobile device as a mobile app and configured for display on a display screen of the electronic mobile device, displaying, via the interface module, a rebate offer available for selection to a consumer of the electronic mobile device, identifying a selection of a displayed rebate offer based on the consumer's electronic input, and receiving, via the interface module, a photograph of proof of purchase data, the proof of purchase data indicating purchase of one or more rebate qualifying products or services. The consumer information may include a consumer's name, physical address, and/or email address, and the proof of purchase data may include a point-of-sale receipt and/or a UPC. A plurality of rebate fulfillment options available for selection by the consumer may be provided, wherein the rebate fulfillment options include receiving a mailed rebate or receiving an electronic rebate. The method may further include validating the rebate based on the consumer identifying information and/or the proof of purchase data. In some embodiments, image processing hardware and/or image processing software accessible to the interface module may be utilized to automatically validate the rebate based, at least partially, on the proof of purchase data. Further, in some embodiments, an electronic rebate value may be provided, via the interface module, to the consumer for substantially immediate use.

While multiple embodiments are disclosed, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the present disclosure, it is believed that the disclosure will be better understood from the following description taken in conjunction with the accompanying Figures, in which:

FIG. 4 illustrates an interface for entering consumer information for a rebate claim submission in accordance with an embodiment of the present disclosure.

FIG. 5 illustrates an interface for reviewing entered consumer information for a mail-in rebate claim submission in accordance with an embodiment of the present disclosure.

DETAILED DESCRIPTION

Figure 1:
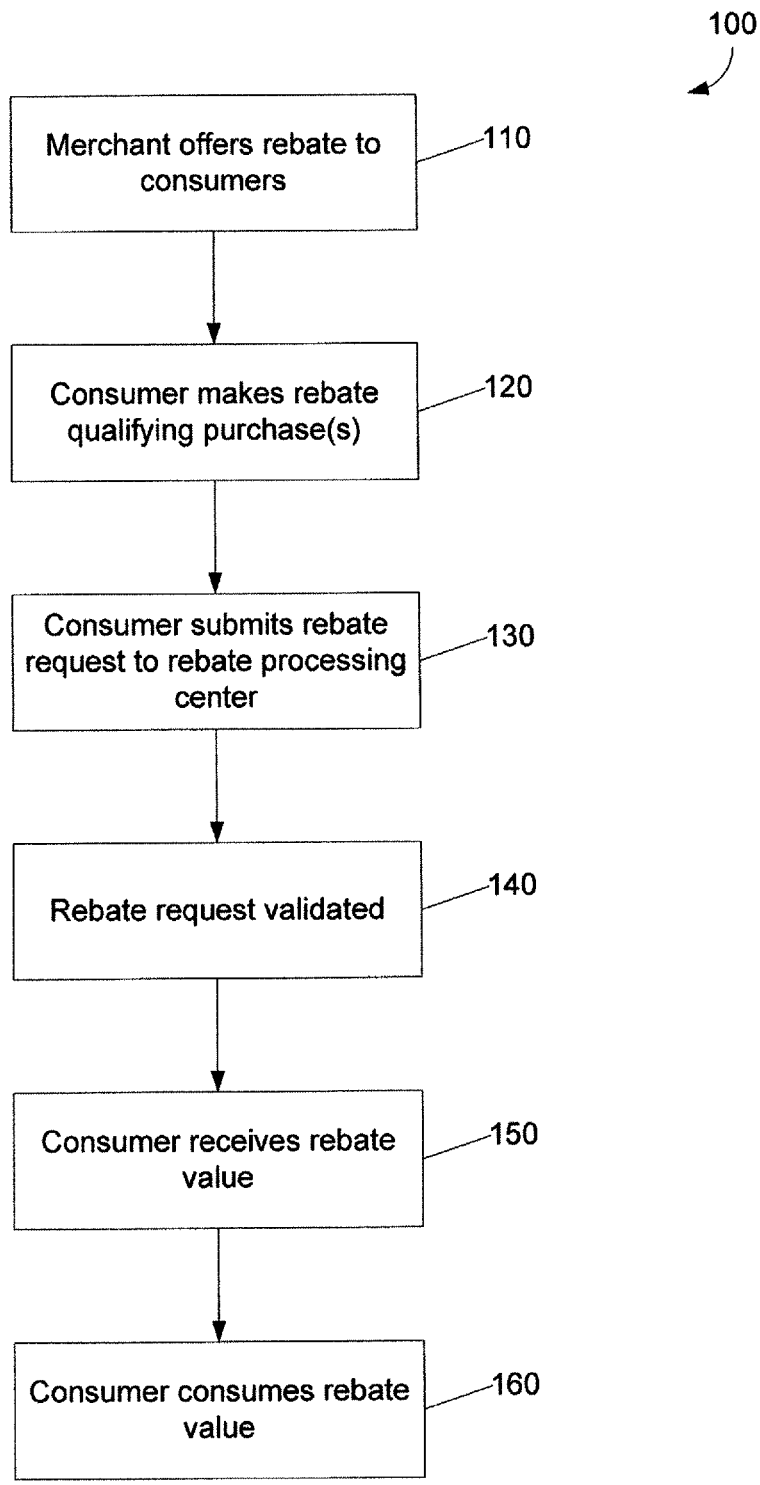
FIG. 1 is a flow chart for a method of rebate submission and fulfillment in accordance with an embodiment of the present disclosure.

The present disclosure relates to novel and advantageous systems and methods for rebate redemption and fulfillment, such as for traditional product marketing rebates. Particularly, the present disclosure relates to novel and advantageous systems and methods for rebate redemption and fulfillment, including the electronic or digital submission of a consumer rebate request having appropriate validation information included therewith.

It is noted that the embodiments may be described as a process or method, which may be depicted as a flowchart, a flow diagram, a data flow diagram, a structure diagram, or a block diagram. Although a flowchart, for example, may illustrate the method as a sequential process, many of the operations can be performed in parallel or concurrently. In addition, the order of the method steps may be rearranged. Similarly, a method could have additional steps not included in the figures or fewer steps than shown in the figures. A method step may correspond to a method, a function, a procedure, a subroutine, a subprogram, etc.

A computing system may be used to execute any of the processes or methods described herein. In embodiments, a computing system may include memory and a processor and is operable to execute computer-executable instructions stored on a computer readable medium that define processes or methods described herein. More specifically, embodiments may be implemented by hardware, software, firmware, middleware, microcode, hardware description languages, or any combination thereof. When implemented in software, firmware, middleware, or microcode, the program code or code segments to perform the necessary tasks may be stored in a machine-readable medium such as a storage medium. A processor or processors may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Hardware and software components used by the rebate processing center, as discussed herein, may be integral portions of a single computer or server or may be connected parts of a computer network. The hardware and software components may be located within the rebate processing center or may be operated offsite by a third-party subcontractor. In other embodiments, portions of the hardware and software components may be divided among a plurality of locations and connected directly or through a global computer information network, such as the Internet.

Generally, the various embodiments of the present disclosure may involve providing a rebate offer to a consumer in relation to the purchase of a particular product or combination of products, such as, for example, a computer, monitor, and printer combination, from a merchant or manufacturer offering the rebate. A consumer may then submit a rebate request to a rebate processing center for redemption of the rebate. For ease and convenience, a consumer may have the option to submit a rebate claim electronically/digitally. The rebate processing center may, among other rebate processing, validate the rebate request received from the consumer. The rebate processing center may select from a variety of rebate processing and validation systems and methods. Upon validation and/or other processing, the value of the rebate may be transferred to the consumer, such as by rebate check, pre-paid rebate card, electronic rebate or e-rebate, a value credited or uploaded to a consumer's value account, such as but not limited to a bank account, debit card account, or reloadable card account, etc. In some embodiments, the consumer may then use the transferred value at generally any location, or in other embodiments, the use of the transferred value may be limited to a particular merchant, such as the merchant offering the rebate.

FIG. 1 illustrates a system and method 100 for submission of a rebate request in accordance with an embodiment of the present disclosure. At step 110, a merchant may offer a rebate to consumers. In some embodiments, this may include notifying the consumer of the rebate offer. Typically, notification may be a written or oral communication indicating the terms of the rebate offer and instructing consumers with regard to satisfaction of the rebate offer. For example, consumers may be notified by a mass distributed flyer or advertisement. Such notifications may appear within printed or electronic media such as newspapers, magazines, journals and the like, internet publications or other internet websites, or any other advertising medium. Additionally, the notifications may be in the form of an email or delivered mail, or provided within a mobile app or other software application. Other forms of notification, such as oral communication or radio and television advertisements, are contemplated to be within the scope of the present disclosure. In some embodiments, consumers do not learn of the rebate offer until after entering a merchant's physical or internet location.

For ease of discussion, rebate offers may be discussed with respect to merchant rebate offers. However, the present disclosure is not limited to only merchant rebate offers, and it is understood that any suitable entity may offer a rebate. By way of example, it will be appreciated that rebates may be offered by various corporate entities, including, but not limited to, product manufacturers, product retailers, service providers, such as but not limited to utilities, and others. Accordingly, a merchant may include any product manufacturer or other business entity that provides goods or services to the public or other private or public entities.

In some embodiments, a merchant may offer a rebate in situations where a consumer purchases a particular item, multiple items, or a combination of items, including items purchased in a single transaction or through multiple transactions, which may further occur on different dates. In other embodiments, a merchant may offer a rebate for any reason the merchant desires, such as a promotional rebate or a prize rebate.

At step 120, a consumer may make a purchase or multiple purchases that qualify the consumer for the rebate offered. Typically, the consumer may travel to a merchant to make a qualifying purchase. In other embodiments, it may not be necessary for the consumer to purchase the item or items at the merchant's physical location, and the consumer may purchase the item by other means, such as by mailing an order form or telephonically or electronically submitting an order. In a further embodiment, consumers may make a qualifying purchase in an electronic format, such as through designated sites connected to a global computer information network and accessible to the consumers through the global computerized information network or through a mobile app. A global computer information network, such as the internet, may contain any number of websites that a user may access, or may be accessed via any suitable interface such as but not limited to, via a mobile app. Such websites and apps may provide information for purchasing products and provide user interfaces through which users may transmit information about themselves, a product order, a credit card number, and the like, as will be understood by those skilled in the art.

Upon completion of a qualifying purchase, in some embodiments, a transaction may be recorded by a point-of-sale data processing and storage system. Typical point-of-sale data processing and storage systems may comprise a computerized system that receives purchase data either by manual entry by an operator or through scanning a UPC supplied on the product packaging by either the merchant or the manufacturer. A receipt may be issued to the consumer. The receipt may be issued to the consumer directly, in the case of an in-store purchase, or electronically transferred to the consumer, in the case of an electronic purchase, for example. An electronic receipt may be in the form of a transfer across a computer network, such as the internet. The point-of-sale data processing and storage system may be any system known in the art for recording and processing purchases at the point of sale. In one embodiment, after making a qualifying purchase, consumers may be provided with a primary receipt and a secondary receipt. The secondary receipt may comprise a record of information associated with the qualifying purchase, whereas the primary receipt may consist essentially of information associated with all purchases, including items not associated with rebate offers. The secondary receipt may also contain information with regard to how consumers may perfect satisfaction of the rebate offer. In another embodiment, the information contained on the primary receipt and secondary receipt, may comprise the traditional information provided by a single receipt.

Subsequent purchase of a rebate qualifying product or products, the consumer may submit a rebate claim to, for example, the merchant or a rebate processing center contracted by the merchant, as shown at step 130. Generally, a rebate claim may comprise the submission by the consumer of a rebate claim form. A rebate claim form may generally request transaction information and selected portions of consumer information. Additionally, a rebate claim form may include a destination address, rebate promotion information, and instructions for submitting material verifying the qualifying purchase, if necessary or desired. Consumer information may comprise any information that identifies or is associated with a particular consumer, such as the consumer's name, address, phone number, e-mail address, etc. Consumer information may also comprise of information regarding a particular consumer's more private information or lifestyle preferences and/or opinions, such as annual income, gender, age, places where the consumer typically shops, items the consumer typically purchases, etc. Such information, if requested, may be useful in conducting consumer surveys and may typically be voluntarily offered by the consumer and not required to receive the rebate. Alternatively, in some embodiments, a rebate claim form may request only enough information to identify the consumer so that the rebate can be provided to the consumer.

As discussed above, with some traditional rebate programs, the consumer is generally required to fill out one or more rebate forms and mail each form to a manufacturer or fulfillment center along with proof of purchase information. Alternatively, some more recent rebate programs provide the ability to submit a rebate claim through electronic means, such as via a website on the internet. However, such rebate programs still require that the consumer mail in proof of purchase information, such as a point-of-sale or cash register receipt and/or UPC for the product, in order to validate the rebate claim or require a direct communication link with a point-of-sale data processing and storage system. Accordingly, while such rebate submission methods may be used with the various embodiments of the present disclosure, the various embodiments disclosed herein, as will be described in more detail below, may additionally or alternatively offer an option for the consumer to electronically or digitally submit a rebate claim or request along with appropriate proof of purchase data, such as but not limited to, a point-of-sale or cash register receipt and/or UPC for the product.

Figure 2:
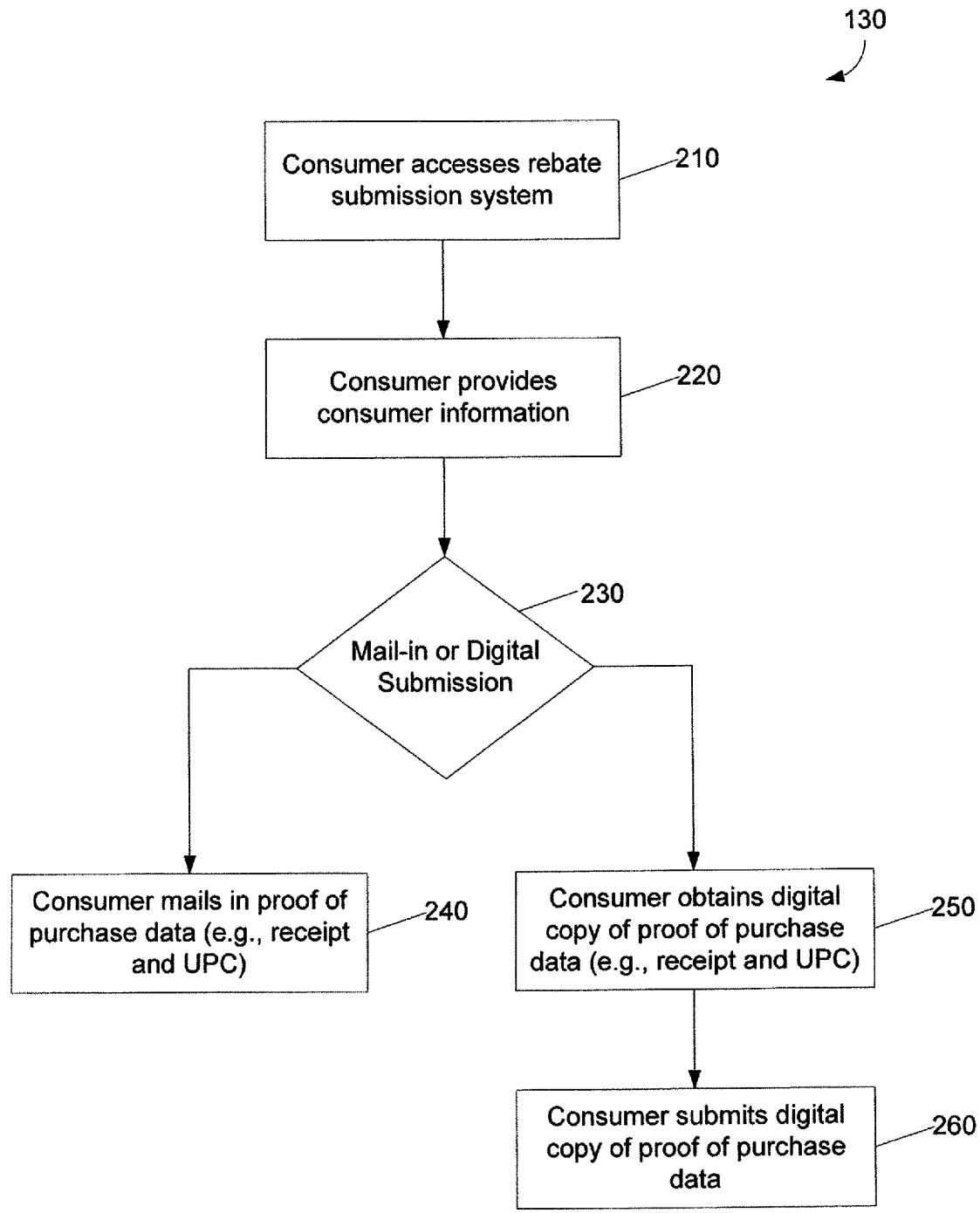
FIG. 2 is a flow chart for a method of rebate claim submission in accordance with an embodiment of the present disclosure.

For example, FIG. 2 illustrates a method for rebate submission 130 according to one embodiment of the present disclosure, and FIGS. 3-9 illustrate various example modules or interfaces for a rebate submission system according to one embodiment of the present disclosure. As indicated above, it is noted that although FIG. 2 illustrates a method as a sequential process, many of the operations can be performed in parallel or concurrently. In addition, the method may include more or fewer steps and/or the order of the method steps may be rearranged without departing from the spirit and scope of the present disclosure.

In step 210, a consumer may access a rebate submission system to submit a rebate claim. A consumer may be provided with instructions as to where and how to access the rebate submission system at any time prior to submission of the rebate claim, such as but not limited to, in the initial notification of the rebate offer or by oral or written communication at the time of purchase, including by providing instructions on the receipt, or by any other method as would be understood by those skilled in the art. In one embodiment, the consumer may be provided with a uniform resource locator ("URL") and may access the rebate submission system by visiting the URL via the internet through any electronic or computing device capable of accessing the internet, such as but not limited to, a personal computer, smartphone, personal digital assistant, tablet PC, etc. For example, in one embodiment, the consumer may access the URL using a menu option at the merchant's or rebate processing center's website. In some embodiments, the URL may appear to be the merchant's or manufacturer's website, but in fact be the rebate processing center's website that is merely linked to the merchant's or manufacturer's website. Additionally, the consumer may access the URL from any location. In one embodiment, the consumer may access the URL from a home computer system. Alternatively, the consumer may access the URL from a computer located at the merchant's location, such as an in-store kiosk.

Figure 3:
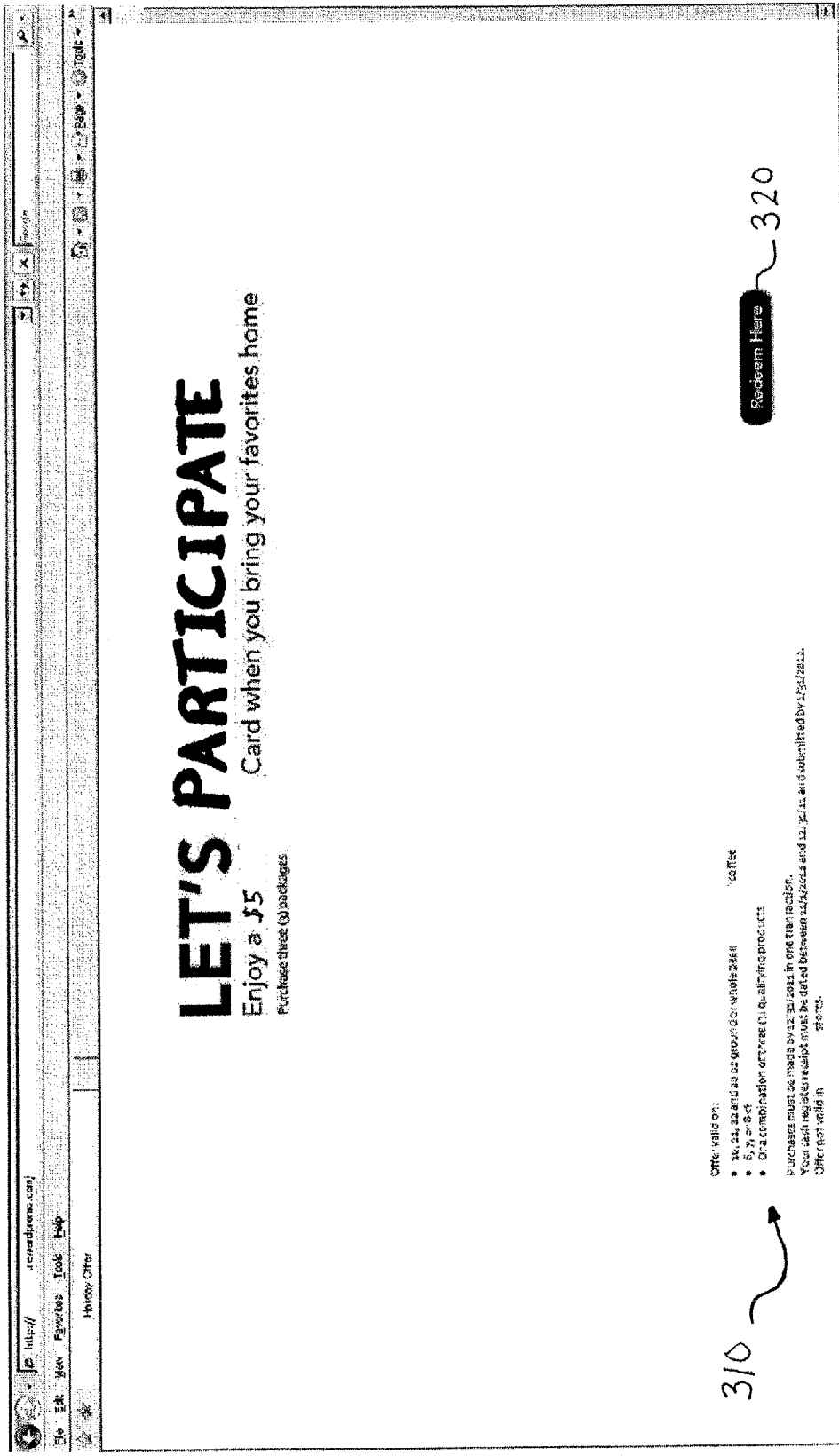
FIG. 3 illustrates an interface for initiating rebate claim submission in accordance with an embodiment of the present disclosure.
Figure 6:
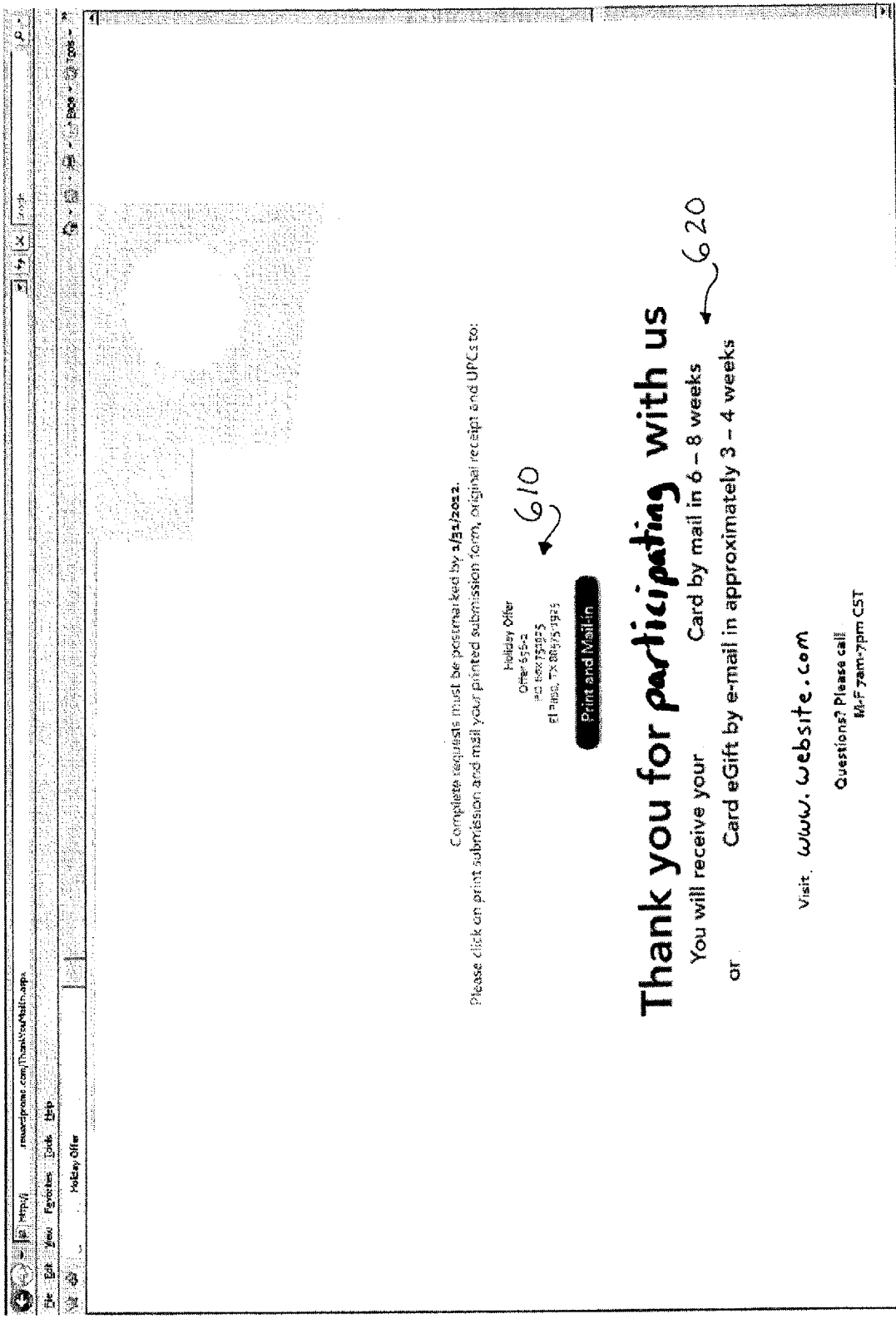
FIGS. 6 and 7 illustrate printable interfaces for mailing in with a rebate claim submission in accordance with an embodiment of the present disclosure.
Figure 7:

Upon accessing the rebate submission system, in one embodiment, the consumer may be presented a landing interface or welcome interface that indicates the consumer is in the correct location for submitting a rebate claim. An example landing interface 300 is illustrated in FIG. 3. Among any other desirable information, the landing interface 300 may provide information relating to the rebate program 310, such as but not limited to, offer details, offer exclusions, valid time period for the offer, other terms and conditions, etc.

Figure 4:
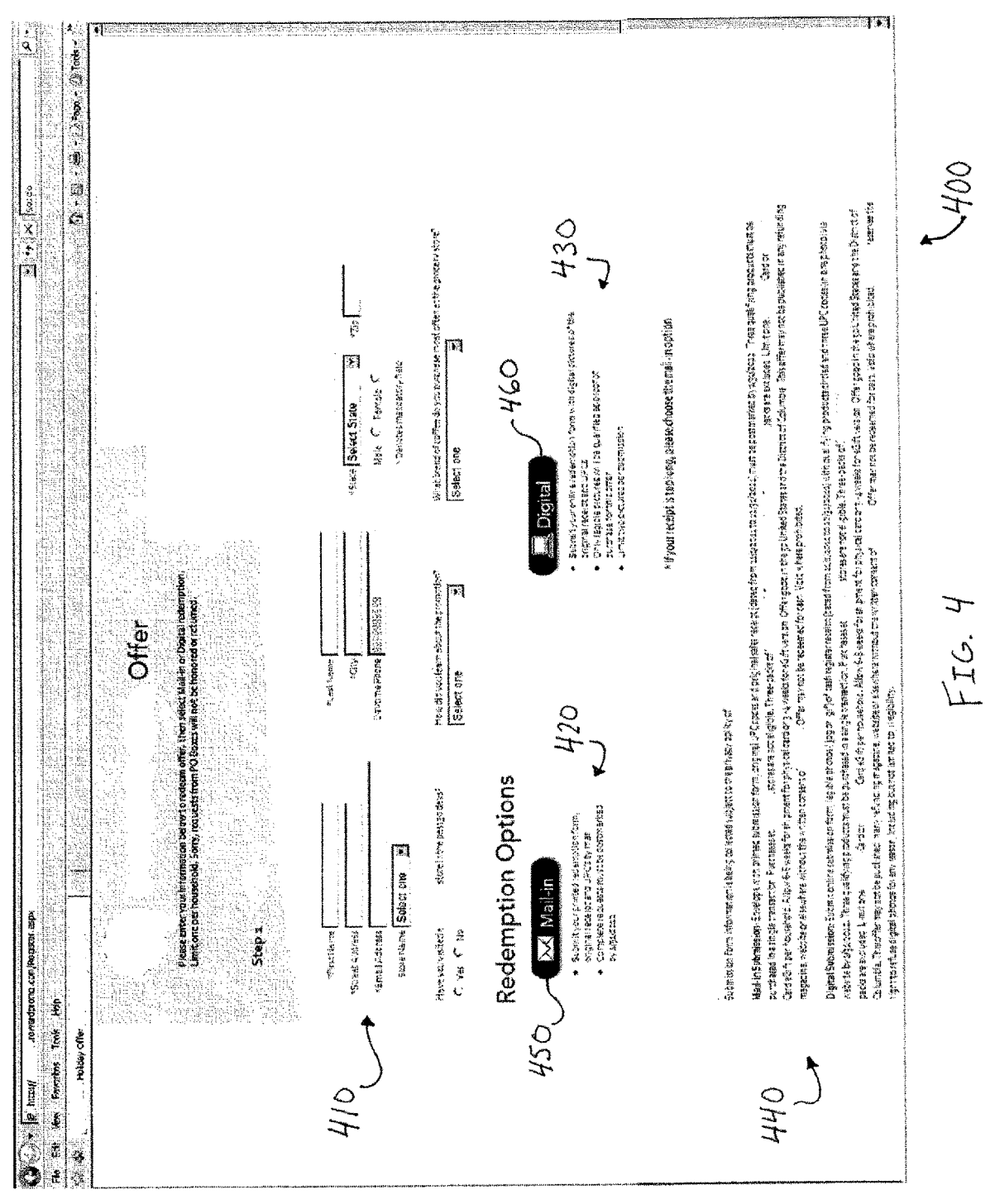

From the landing interface 300, the consumer may be directed to an initial claim submission interface 400, as shown in FIG. 4. In some embodiments, the consumer may take some action, such as but not limited to, the actuation of a user interface button or other actuation device 320 of the landing interface 300, in order to bring the consumer to the initial claim submission interface 400. However, in other embodiments, it is recognized that the consumer may be automatically redirected to the initial claim submission interface 400 without any action required by the consumer. While discussed as separate interfaces or modules, it is recognized that in other embodiments, the landing interface 300 and the initial claim submission interface 400, as well as any other interfaces described herein, in any combination, may be combined as a single interface or multiple interfaces in different configurations than shown and described herein.

In step 220, from the initial claim submission interface 400 for example, the consumer may provide any required consumer information desired or required by the merchant or rebate processing center in order to, for example, identify the consumer requesting the rebate. As discussed above, consumer information may comprise any information that identifies or is associated with a particular consumer, such as the consumer's name, address, phone number, e-mail address, etc. In some embodiments, consumer information may also comprise of information regarding a particular consumer's more private information or lifestyle preferences and/or opinions, such as annual income, gender, age, places where the consumer typically shops, items the consumer typically purchases, etc. The initial claim submission interface 400 may provide any suitable number of data entry fields 410 by which the consumer may provide such information, as will be understood by those skilled in the art. The data entry fields 410 may include any suitable style of data entry field, such as but not limited to, text fields, drop-down selection boxes, radio buttons, etc.

At the initial claim submission interface 400, the consumer may also be provided with one or more claim submission options 420, 430. For example, the consumer may be provided, in one embodiment, with the option 420 to submit the consumer information electronically via the initial claim submission interface 400 while completing the rebate claim submission by mailing in any required proof of purchase data, such as but not limited to, a point-of-sale or cash register receipt and/or UPC for the product. As discussed in further detail below, the consumer may also be provided with an option 430 for completing the rebate claim, including consumer information as well as any proof of purchase data, by electronic or digital submission. By such option, in some embodiments, the consumer may be able to complete the entire rebate claim electronically or digitally, such as via the internet or other network. As indicated in step 230 of FIG. 2, the consumer may select the type of rebate claim submission from the available submission options, e.g., mail in 420 or digital 430.

The initial claim submission interface 400 may also include any other desirable information. For example, the initial claim submission interface 400 may include additional information relating to the rebate program 440, including but not limited to, offer details, offer exclusions, valid time period for the offer, information relating to the type of submissions the consumer may select from, other terms and conditions, etc.

If a consumer selects an option relating to a traditional type of submission, traditional rebate claim submission methods may be used. For example, where a consumer selects mail in option 420, thereby opting to complete the rebate claim by mail, traditional mail in rebate claim submission methods may be used. The consumer may be provided with any additional information or instructions for mailing in the remaining required information, and accordingly, in step 240 for example, the consumer may subsequently mail in any required proof of purchase data.

Figure 5:
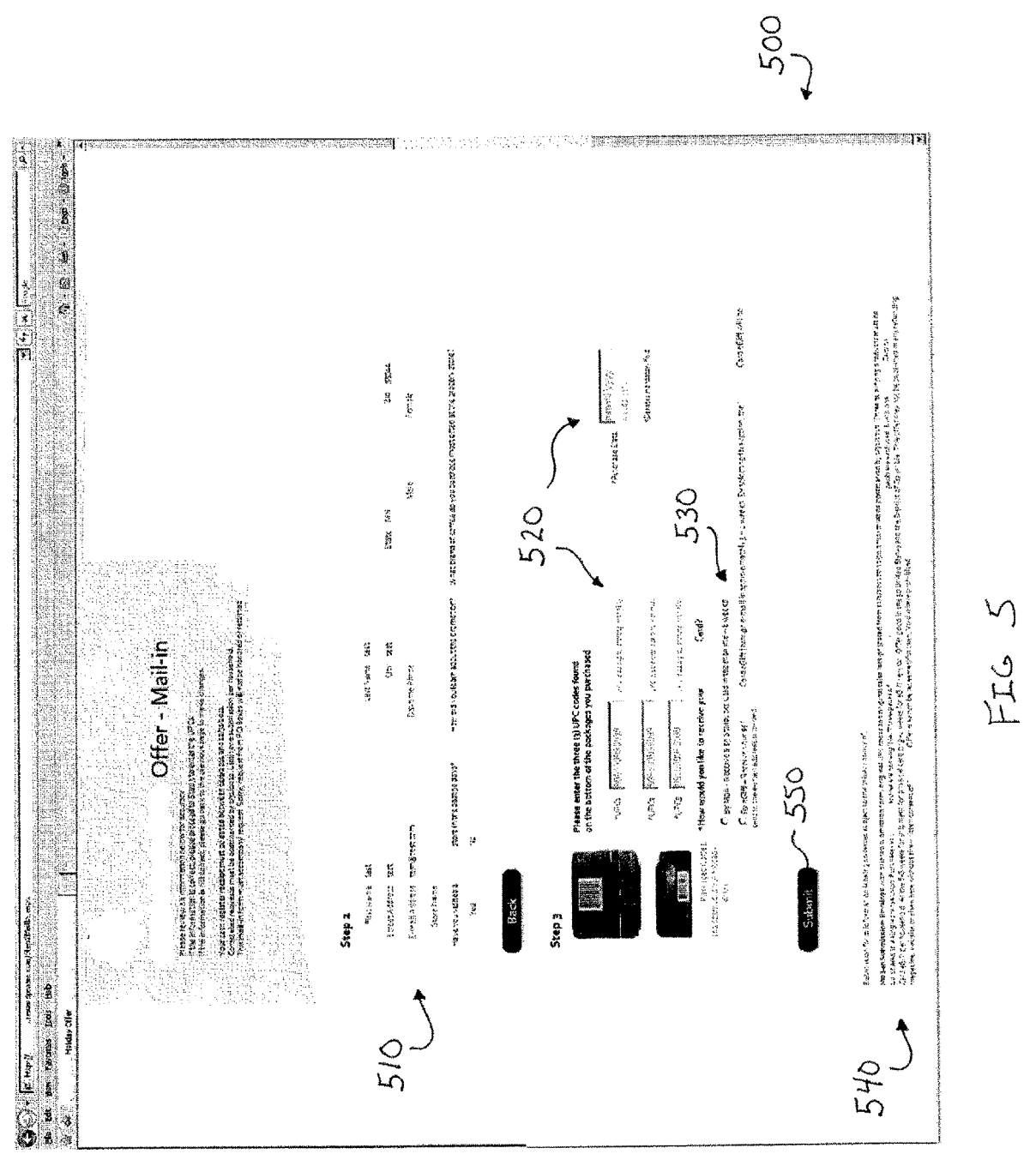

In one embodiment, the consumer may take some action at the initial claim submission interface 400, such as but not limited to, the actuation of a user interface button or other actuation device 450, in order to bring the consumer to a mail in confirmation interface 500, illustrated in FIG. 5. The mail in confirmation interface 500 may provide an interface where the consumer can verify the entered consumer information 510, as well as confirm that the mail in option was selected. In some embodiments, the consumer may be requested or required to provide additional information 520 relating to the type of proof of purchase data the consumer will be mailing in. For example, the consumer may be required to provide information relating to a point-of-sale or cash register receipt and/or UPC for the product, which may include, for example, the UPCs themselves, purchase data information, transaction or receipt identification number(s), etc.

In further embodiments, a rebate may have more than one rebate fulfillment option, such as by rebate check, pre-paid rebate card, an electronic rebate check, etc. In such embodiments, at some time during rebate claim submission, such as at the mail in confirmation interface 500, or optionally at a later time, the consumer may be provided with a selection of the available types of rebate fulfillments options 530.

As with the other interfaces, the mail in confirmation interface 500 may also include any other desirable information. For example, the mail in confirmation interface 500 may include additional information relating to the rebate program 540, including but not limited to, offer details, offer exclusions, valid time period for the offer, information relating to the type of submission selected, other terms and conditions, etc.

Once the consumer has confirmed that the entered consumer information is correct, and provided any additional requested information, the consumer may take some action at the mail in confirmation interface 500, such as but not limited to, the actuation of a user interface button or other actuation device 550, in order to submit the partial rebate claim. In some embodiments, the consumer may be redirected to one or more submission form interfaces 600, 700, illustrated in FIGS. 6 and 7, respectively, where the consumer may be provided with further details about the rebate offer and the type of rebate submission option selected. For example, in an embodiment with a mail in option, the submission form interface(s) may provide information relating to where the remaining rebate claim data (e.g., proof of purchase data) may be mailed 610, a time frame for when the consumer can expect to receive the rebate 620, instructions for providing the remaining rebate claim data 710, or any other suitable information as desired or required by the merchant or rebate processing center. In some embodiments, the submission form interfaces may also re-confirm information previously entered by the consumer 720. As with the other interfaces, the submission form interfaces 600, 700 may also include any other desirable information relating to the rebate program, including but not limited to, offer details, offer exclusions, valid time period for the offer, information relating to the type of submission selected, other terms and conditions, etc.

In a further embodiment, the submission form interface(s) may be printed out and mailed along with the remaining rebate claim data for ease and convenience to both the consumer and the merchant or rebate processing center. In still further embodiments, the submission form interface may include a unique tracking identifier 730, enabling easy and efficient identification of the mail in portion of the rebate claim submission and association with the previously provided consumer information. Such unique tracking identifier 730 may be provided in any suitable form, including but not limited to a unique identifying number or alphanumeric sequence, a scannable bar code, including two-dimensional and three-dimensional bar codes, etc.

Figure 8:
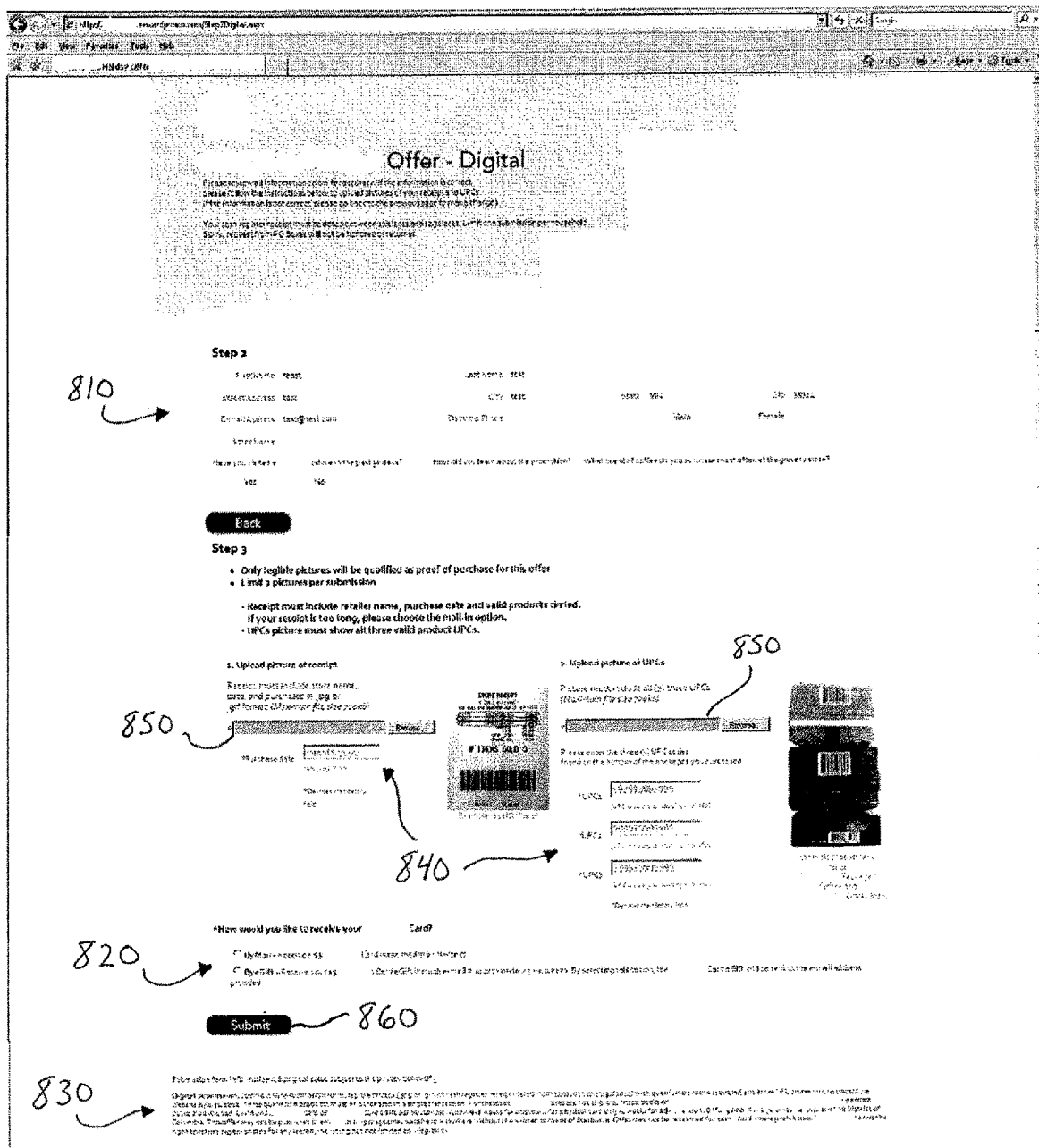
FIG. 8 illustrates an interface for entering proof of purchase information for a rebate claim submission in accordance with an embodiment of the present disclosure.

Referring back to FIG. 2, if, in step 230, a consumer selects an option relating to electronic or digital submission of the consumer information and proof of purchase data, the consumer may be directed a digital information submission interface 800, illustrated in FIG. 8. In one embodiment, the consumer may take some action at the initial claim submission interface 400, such as but not limited to, the actuation of a user interface button or other actuation device 460, in order to bring the consumer to the digital information submission interface 800. Like the mail in confirmation interface 500, the digital information submission interface 800 may provide an interface where the consumer can verify the entered consumer information 810, as well as confirm that the electronic or digital submission option was selected. Also similar to the mail in confirmation interface 500, the digital information submission interface 800 may provide the consumer with a selection of the available types of rebate fulfillments options 820 and may include any other desirable information, such as additional information relating to the rebate program 830, including but not limited to, offer details, offer exclusions, valid time period for the offer, information relating to the type of submission selected, other terms and conditions, etc.

In some embodiments, the consumer may be requested or required to provide additional information 840 relating to the type of proof of purchase data the consumer will be digitally submitting. For example, the consumer may be required to provide information relating to a point of sale or cash register receipt and/or UPC for the product, which may include, for example, the UPCs themselves, purchase data information, transaction or receipt identification number(s), etc. In some embodiments, the type of proof of purchase data required to be submitted by the consumer may be specified by the merchant and/or rebate processing center.

In addition, the digital information submission interface 800 may provide the consumer with data submission fields 850 whereby the consumer can upload and submit digital copies of the proof of purchase data. As will be recognized by those skilled in the art, a consumer can obtain digital copies of the proof of purchase data by any suitable number of ways, including but not limited to, scanning the proof of purchase data or taking a picture of the proof of purchase data. The data submission fields 850 may include any suitable style of data entry field, such as but not limited to, text fields, upload entry fields, etc. In some embodiments, the type of file (e.g., jpeg, gif, etc.) that may be uploaded may be restricted. In further embodiments, additional requirements relating to the proof of purchase data may be required, such as but not limited to, some identification (e.g., circling, highlighting, etc.) of specified information carried on the proof of purchase data.

Figure 9:
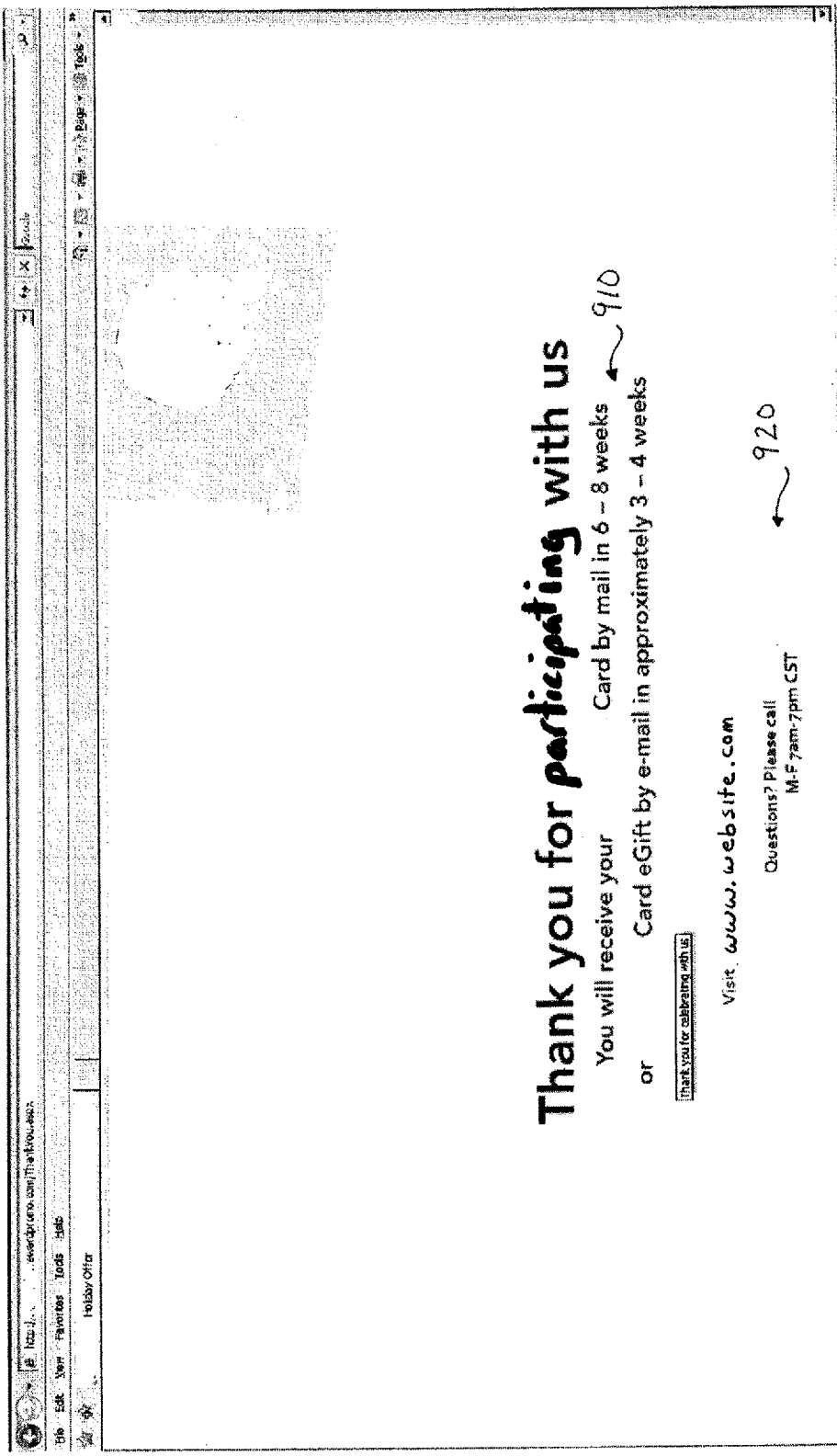
FIG. 9 illustrates an interface for confirming receipt of a rebate claim submission with validation information in accordance with an embodiment of the present disclosure.
Figure 10:
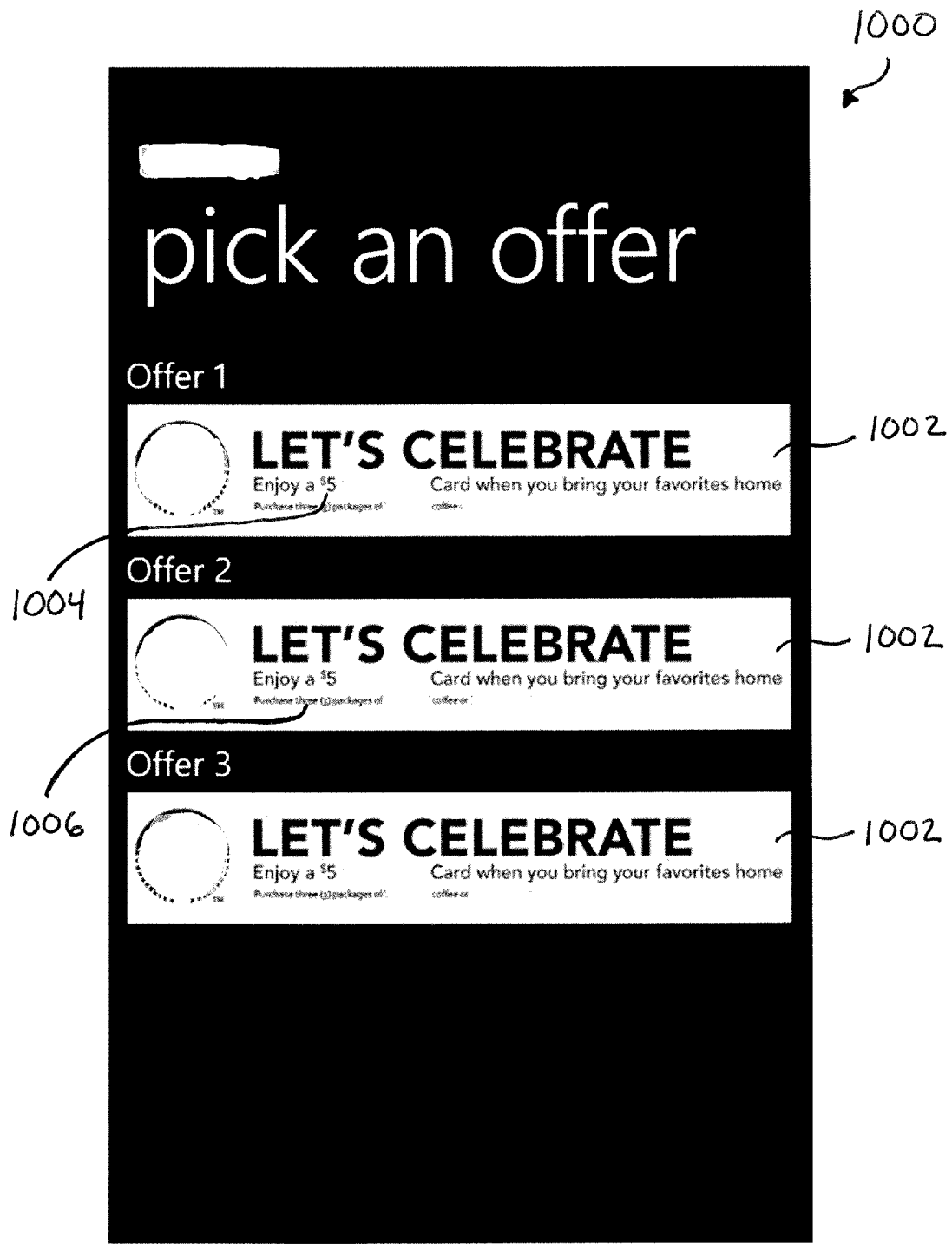
FIG. 10 illustrates an interface for initiating rebate claim submission in accordance with another embodiment of the present disclosure.

Once the consumer has confirmed that the entered consumer information is correct, provided any additional requested information, and identified and/or uploaded the digital copy or copies of the proof of purchase data, the consumer may take some action at the digital information submission interface 800, such as but not limited to, the actuation of a user interface button or other actuation device 860, in order to submit the electronic or digital rebate claim. In some embodiments, the consumer may be redirected to a digital submission confirmation interface 900, as illustrated in FIG. 9, where the consumer may be provided with a confirmation that the electronic or digital rebate claim has been submitted and any other suitable information or details as desired by the merchant or rebate processing center, such as but not limited to, information relating to a time frame for when the consumer can expect to receive the rebate 910, contact information 920, etc. In some embodiments, the digital submission confirmation interface 900 may also re confirm information previously entered by the consumer. As with the other interfaces, the digital submission confirmation interface 900 may also include any other desirable information relating to the rebate program, including but not limited to, offer details, offer exclusions, valid time period for the offer, information relating to the type of submission selected, other terms and conditions, etc.

As indicated above, in various embodiments, it is intended that consumers be able to access the rebate submission system by visiting a URL via the internet through any electronic or computing device capable of accessing the internet, such as but not limited to, a personal computer, smartphone, personal digital assistant, tablet PC, etc. However, the internet browsers on many devices, such as smartphones and tablet devices, are limited in functionality, and oftentimes do not allow pictures to be uploaded and/or do not permit browsing for pictures. Accordingly, FIGS. 10-14 illustrate various example modules or interfaces for a rebate submission system according to yet another embodiment of the present disclosure. Specifically, FIGS. 10-14 illustrate various example modules or interfaces for a rebate submission system via a mobile application, or mobile app, which can provide functionality typically missing from the limited internet browsers available with smartphones, tablet devices, and the like. As indicated above, a merchant or any number of merchants may offer one or more rebates to consumers. In an initial step, this may include notifying the consumer of the rebate offer(s). While notification may be any written or oral communication indicating the terms of the rebate offer and instructing consumers with regard to satisfaction of the rebate offer, such as but not limited to, notification by a mass distributed flyer or advertisement or by printed or electronic media such as newspapers, magazines, journals and the like, internet publications or other internet websites, or any other advertising medium, in one embodiment, a consumer may be notified of all rebates offered to them by one or more merchants by accessing a mobile app. A mobile app, in some embodiments, may be configured and/or branded specifically to a particular merchant, and as such may provide rebate offers and/or rebate descriptions applicable to only that particular merchant. In other embodiments, however, a mobile app may be generic or generically branded and configured to provide notifications of rebate offers and/or rebate descriptions for a plurality of merchants opting for such participation with the mobile rebate app.

As described above, according to step 210 in FIG. 2, a consumer may access the rebate submission system to submit a rebate claim. With regard to a mobile app embodiment, a consumer may access the rebate submission system for viewing rebate offers as well as submitting a rebate claim simply by accessing or opening the mobile app. In this regard, the consumer may access the rebate submission system via the mobile app from practically any location wherein network connectivity or mobile network connectivity is available.

Similar to the embodiments of FIGS. 3-9, upon accessing the rebate submission system via a mobile app, in one embodiment, the consumer may be presented a landing interface or welcome interface that indicates the consumer has successfully connected with the rebate submission system. An example landing interface may include an application splash screen or main menu, among any other useful information, such as but not limited to, instructions on how to use the mobile app or an icon or menu item selectable for accessing such instructions. In another embodiment, illustrated in FIG. 10, a landing interface 1000 for the mobile app may include, or provide an icon or menu item for directing the consumer to, a list of one or more current rebate offers 1002 available for participation and/or selection by the consumer. The rebate offers 1002 may be presented in the form of selectable icons, buttons, or other type of activatable widget displayed on an electronic device running the mobile app, such as but not limited to, by touching the screen of the electronic device in the location of the selectable rebate offer. In a branded mobile app, these displayed offers 1002 may be specific to a single, particular merchant or group of related merchants. In other embodiments, such as with a generic mobile app, the one or more displayed rebate offers 1002 may include rebate offers for a plurality of merchants opting for such participation with the mobile rebate app. A rebate offer 1002 may include or display any suitable amount of information so that the consumer can readily assess whether the rebate offer is one they are interested in. For example, in some embodiments, a rebate offer 1002 may include or display a value 1004 for the rebate and the basic requirement(s) 1006 for qualifying for the rebate. In other embodiments, such information may include the rebate offer details, offer exclusions, a valid time period for the offer, and/or other terms and conditions, etc. In still further embodiments, such information may be alternatively or additionally available upon consumer selection of the rebate offer via the electronic device on which the mobile app is running, wherein such information may be provided in a different screen, interface, or pop-up window, etc.

Figure 11:
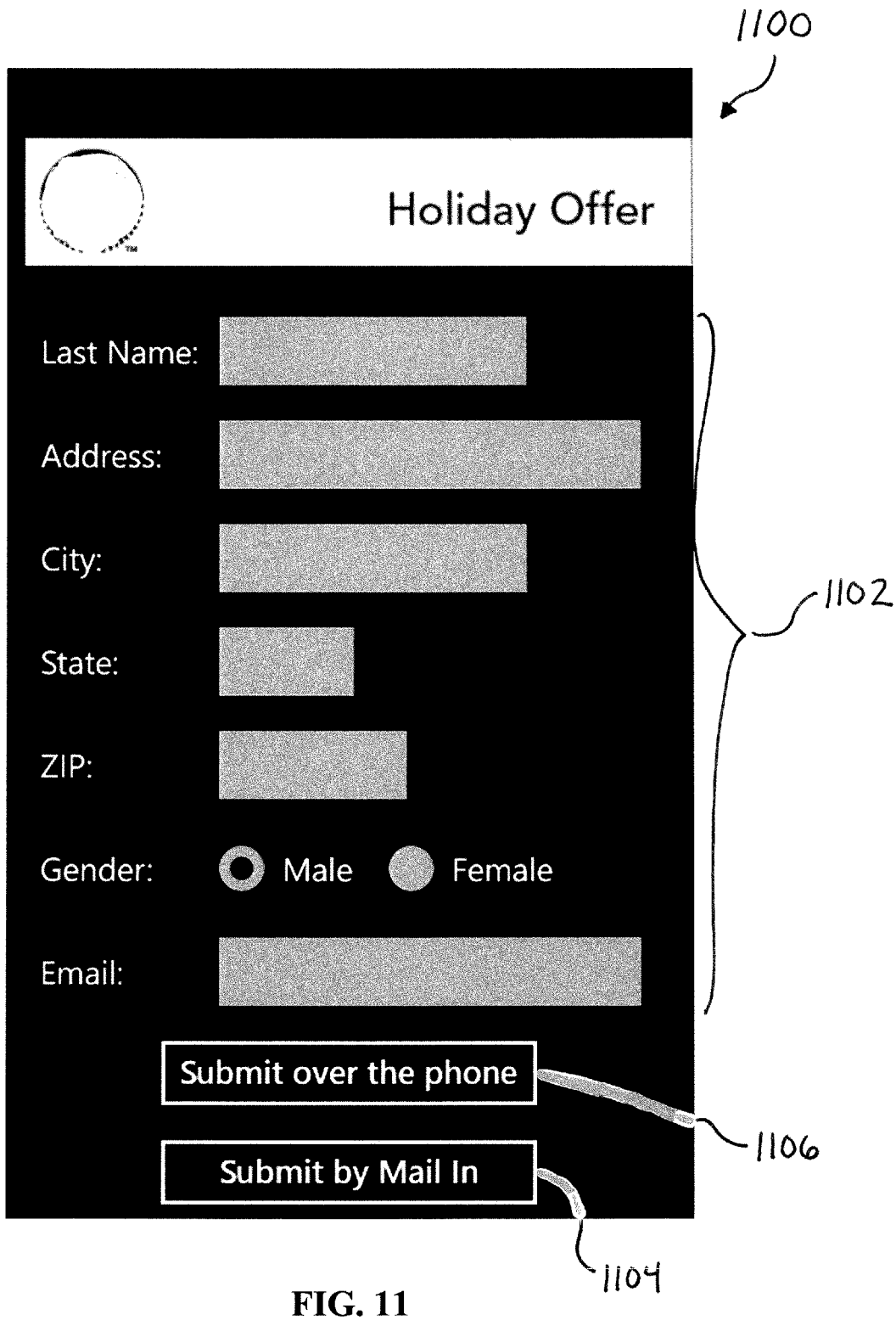
FIG. 11 illustrates an interface for entering consumer information for a rebate claim submission in accordance with another embodiment of the present disclosure.

Upon selection of a rebate offer from the displayed list of rebate offers, the consumer may be directed to an initial claim submission interface 1100, as shown in FIG. 11. As with the above embodiments, while discussed as separate interfaces or modules, it is recognized that in other embodiments, the landing interface 1000 and the initial claim submission interface 1100, as well as any other interfaces described herein, in any combination, may be combined as a single interface or multiple interfaces in different configurations than shown and described herein.

As described above, according to step 220 in FIG. 2, from the initial claim submission interface 1100 for example, the consumer may provide any required consumer information desired or required by the merchant or rebate processing center in order to, for example, identify the consumer requesting the rebate. As discussed above, consumer information may comprise any information that identifies or is associated with a particular consumer, such as the consumer's name, address, phone number, e-mail address, etc. In some embodiments, consumer information may also comprise of information regarding a particular consumer's more private information or lifestyle preferences and/or opinions, such as annual income, gender, age, places where the consumer typically shops, items the consumer typically purchases, etc. The initial claim submission interface 1100 may provide any suitable number of data entry fields 1102 by which the consumer may provide such information, as will be understood by those skilled in the art. The data entry fields 1102 may include any suitable style of data entry field, such as but not limited to, text fields, drop-down selection boxes, radio buttons, etc. In some embodiments, after a first time such information is requested and entered by the consumer, or, for example, after such information is entered as part of and during an initial registration of the mobile app, such information, or portions thereof, may be saved for future use. In such embodiments, the consumer may not be required to repeatedly submit consumer information for each rebate offer, as the mobile app will already have the information available. Thus, in some embodiments, after such consumer information is saved by the mobile app, the initial claim submission interface 1100 may be bypassed or may otherwise omit any request for such consumer information. In still further embodiments, the mobile app may save and store consumer information for multiple users.

At the initial claim submission interface 1100, the consumer may also be provided with one or more claim submission options 1104, 1106. For example, the consumer may be provided, in one embodiment, with the option 1104 to submit the consumer information electronically via the initial claim submission interface 1100 while completing the rebate claim submission by mailing in any required proof of purchase data, such as but not limited to, a point-of-sale or cash register receipt and/or UPC for the product. As discussed in further detail below, the consumer may also be provided with an option 1106 for completing the rebate claim, including consumer information as well as any proof of purchase data, by electronic or digital submission via the consumer's mobile electronic device, such as but not limited to, a smartphone or other mobile phone. By selecting such option, in some embodiments, the consumer may be able to complete the entire rebate claim electronically or digitally, such as via the internet, mobile network, or other network. As described above, according to step 230 in FIG. 2, the consumer may select the type of rebate claim submission from the available submission options, e.g., mail in 1104 or digital 1106.

As with the previously described embodiments, the initial claim submission interface 1100 of the mobile app may also include any other desirable information. For example, the initial claim submission interface 1100 may include additional information relating to the rebate program, including but not limited to, offer details, offer exclusions, valid time period for the offer, information relating to the type of submissions the consumer may select from, other terms and conditions, etc.

As described above, if a consumer selects an option relating to a traditional type of submission, traditional rebate claim submission methods may be used. For example, where a consumer selects mail in option 1104, thereby opting to complete the rebate claim by mail, traditional mail in rebate claim submission methods may be used. The consumer may be provided with any additional information or instructions for mailing in the remaining required information, and accordingly, in step 240 of FIG. 2 for example, the consumer may subsequently mail in any required proof of purchase data.

In one embodiment, the consumer may take some action at the initial claim submission interface 1100, such as but not limited to, the actuation of a user interface button or other actuation device 1104, in order to bring the consumer to a mail in confirmation interface, similar to that illustrated in FIG. 5, but preferably further optimized for a mobile app. As described above, the mail in confirmation interface may provide an interface where the consumer can verify the entered consumer information, as well as confirm that the mail in option was selected. In some embodiments, the consumer may be requested or required to provide additional information relating to the type of proof of purchase data the consumer will be mailing in. For example, the consumer may be required to provide information relating to a point-of-sale or cash register receipt and/or UPC for the product, which may include, for example, the UPCs themselves, purchase data information, transaction or receipt identification number(s), etc.

In further embodiments, a rebate may have more than one rebate fulfillment option, such as by rebate check, pre-paid rebate card, an electronic rebate check, etc. In such embodiments, at some time during rebate claim submission, such as at the mail in confirmation interface, or optionally at a later time, the consumer may be provided with a selection of the available types of rebate fulfillments options, as previously described.

Once the consumer has confirmed that the entered consumer information is correct, and provided any additional requested information, the consumer may take some action at the mail in confirmation interface, such as but not limited to, the actuation of a user interface button or other actuation device, in order to submit the partial rebate claim. In some embodiments, the consumer may be redirected to one or more submission form interfaces, similar to those illustrated in FIGS. 6 and 7, but preferably further optimized for a mobile app, where the consumer may be provided with further details about the rebate offer and the type of rebate submission option selected. For example, in an embodiment with a mail in option, the submission form interface(s) may provide information relating to where the remaining rebate claim data (e.g., proof of purchase data) may be mailed, a time frame for when the consumer can expect to receive the rebate, instructions for providing the remaining rebate claim data, or any other suitable information as desired or required by the merchant or rebate processing center.

In a further embodiment, the submission form interface(s) may be printed out and mailed along with the remaining rebate claim data for ease and convenience to both the consumer and the merchant or rebate processing center. In still further embodiments, the submission form interface may include a unique tracking identifier, enabling easy and efficient identification of the mail in portion of the rebate claim submission and association with the previously provided consumer information. Such unique tracking identifier, as described above, may be provided in any suitable form, including but not limited to a unique identifying number or alphanumeric sequence, a scannable bar code, including two-dimensional and three-dimensional bar codes, etc.

Figure 12:
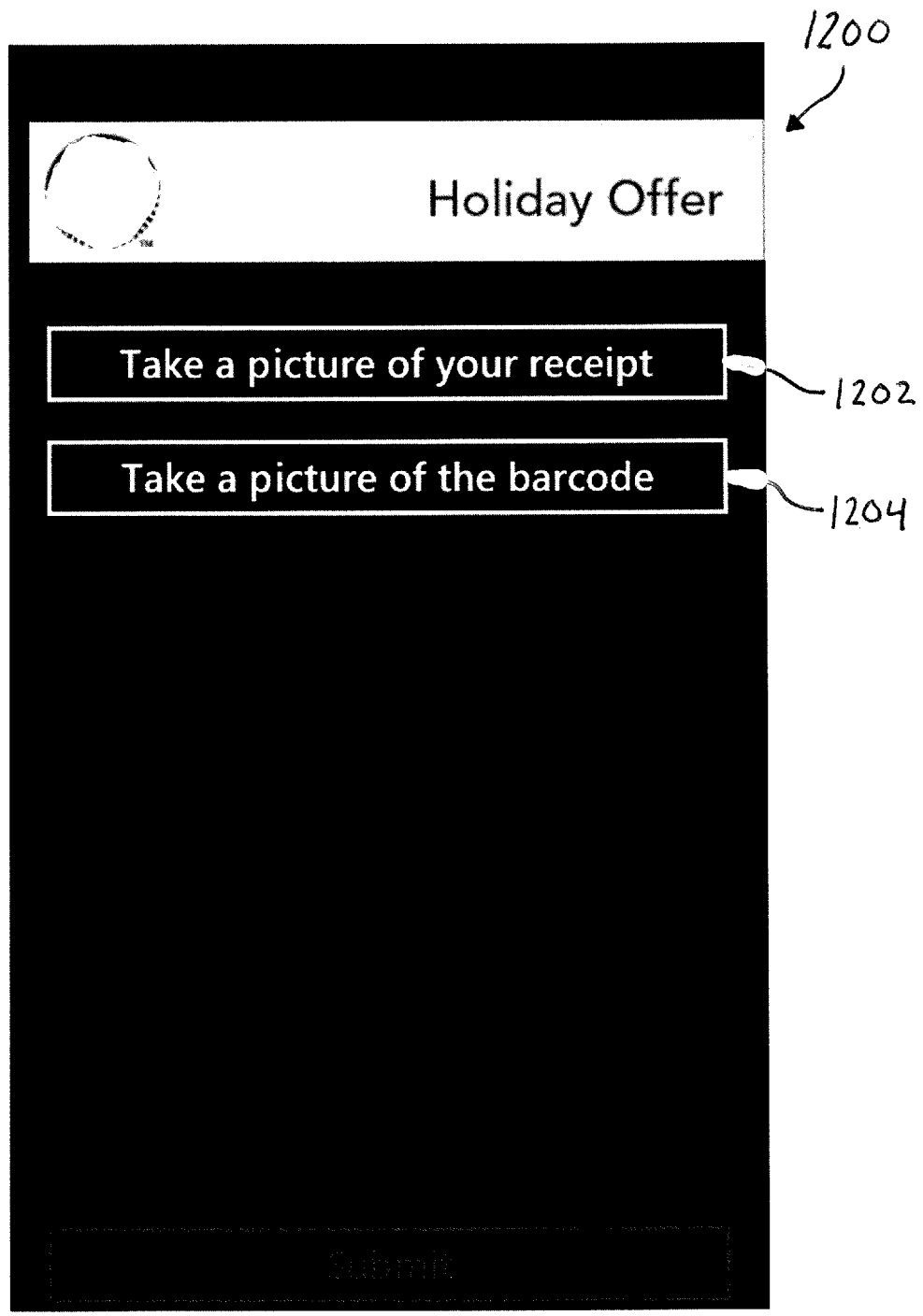
FIGS. 12 and 13 illustrate an interface for entering proof of purchase information for a rebate claim submission in accordance with another embodiment of the present disclosure.

Referring back to FIG. 2, if, in step 230, a consumer selects an option relating to electronic or digital submission of the consumer information and proof of purchase data, the consumer may be directed a digital information submission interface 1200, illustrated in FIG. 12. In one embodiment, the consumer may take some action at the initial claim submission interface 1100, such as but not limited to, the actuation of a user interface button or other actuation device 1106, in order to bring the consumer to the digital information submission interface 1200. The digital information submission interface 1200 may provide an interface where the consumer can verify the entered consumer information, as well as confirm that the electronic or digital submission option was selected. The digital information submission interface 1200 may additionally or alternatively provide the consumer with a selection of the available types of rebate fulfillments options, as described above, and may include any other desirable information, such as additional information relating to the rebate program, including but not limited to, offer details, offer exclusions, valid time period for the offer, information relating to the type of submission selected, other terms and conditions, etc.

In one embodiment, however, the consumer may be requested or required to provide additional information relating to the type of proof of purchase data the consumer will be digitally submitting. For example, the consumer may be required to provide information relating to a point of sale or cash register receipt and/or UPC for the product, which may include, for example, the UPCs themselves, purchase data information, transaction or receipt identification number(s), etc. In some embodiments, the type of proof of purchase data required to be submitted by the consumer may be specified by the merchant and/or rebate processing center.

Figure 13:
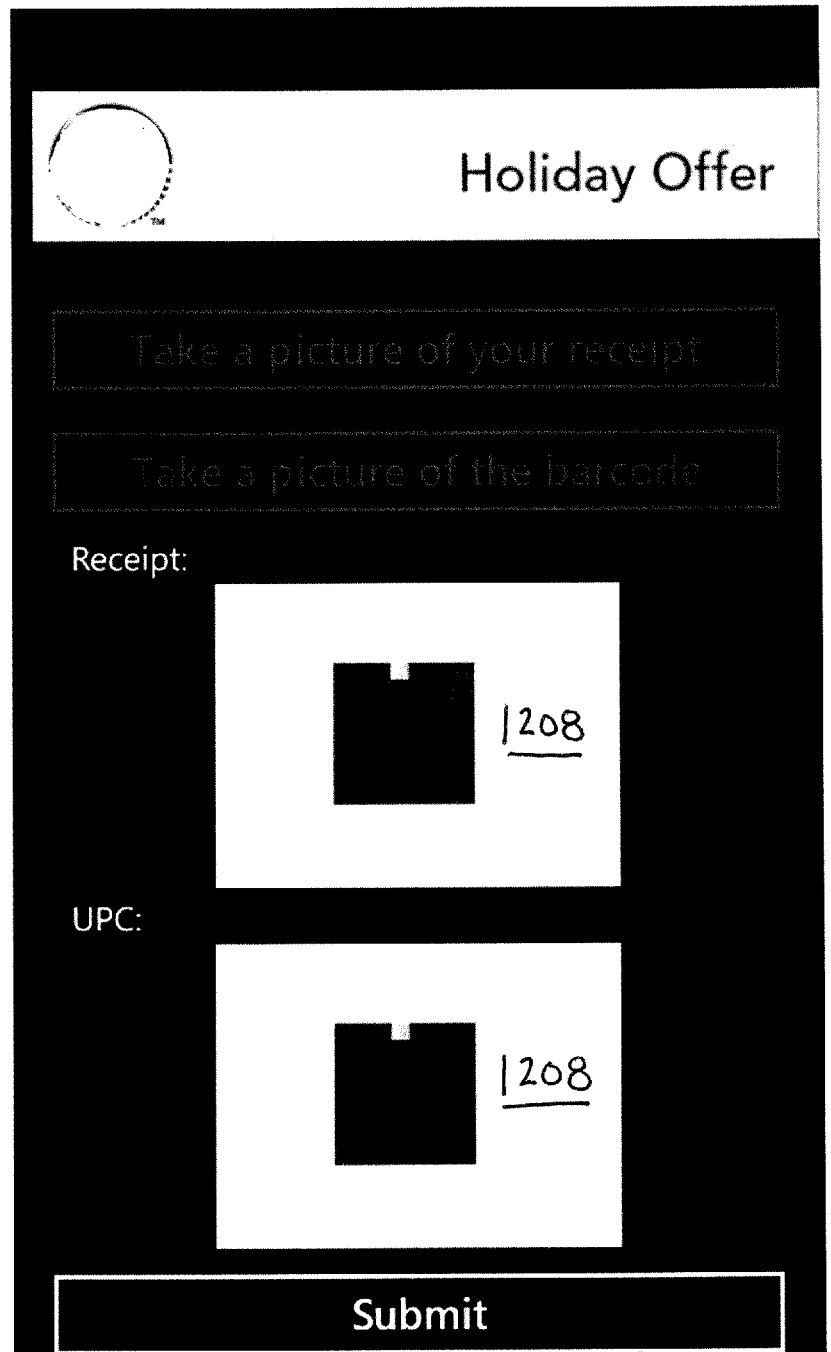

Accordingly, the digital information submission interface 1200 may provide the consumer with the ability to upload and submit digital copies of the proof of purchase data. As will be recognized by those skilled in the art, a consumer can obtain digital copies of the proof of purchase data by any suitable number of ways, including but not limited to, scanning the proof of purchase data or taking a picture of the proof of purchase data. As described in detail above with respect to FIG. 8, the digital information submission interface 1200 may provide the consumer with data submission fields whereby the consumer can upload and submit digital copies of the proof of purchase data. However, in another embodiment, as illustrated in FIGS. 12 and 13, the digital submission interface 1200 may permit the consumer to take in-app pictures of the proof of purchase data. In this regard, the digital submission interface 1200 may include one or more options 1202, 1204, which may depend on the requirements for the rebate offer, from which the consumer may select to provide a picture of the required proof of purchase data. For example, in one embodiment, where a picture of the point-of-sale receipt and/or the UPC barcode is required to redeem a particular rebate offer, the digital submission interface 1200 may include a selectable user interface button or icon for taking a picture of the receipt 1202 and a selectable user interface button or icon for taking a picture of the UPC barcode 1204. Requiring a picture of a receipt and/or UPC barcode are but two examples of the type of proof of purchase data that may be required by some rebate offers. It is understood that any other suitable proof of purchase data or combination of proof of purchase data may be similarly utilized. At any rate, the consumer may take some action at the digital information submission interface 1200, such as but not limited to, the actuation of a user interface button or other actuation device 1202, 1204 related to one of the options, in order to bring the consumer to a camera or photo interface, similar to typical camera or photo interfaces on smartphones and tablets, whereby the user can aim their electronic device at the required proof of purchase data and take a photo thereof. In further embodiments, additional requirements relating to the proof of purchase data may be required, such as but not limited to, some identification (e.g., circling, highlighting, etc.) of specified information carried on the proof of purchase data.

Upon taking a picture of the required proof of purchase data, the digital information submission interface 1200 may display the pictures 1208, or thumbnails of the pictures, of the proof of purchase data for the user to review prior to submission. The consumer may also have the ability to reshoot the photos, if desired. In some embodiments, the mobile app may have software configured for assessing the quality of the pictures, and as such, the mobile app may further require the consumer to reshoot the photos if the quality is below a certain threshold.

Figure 14:
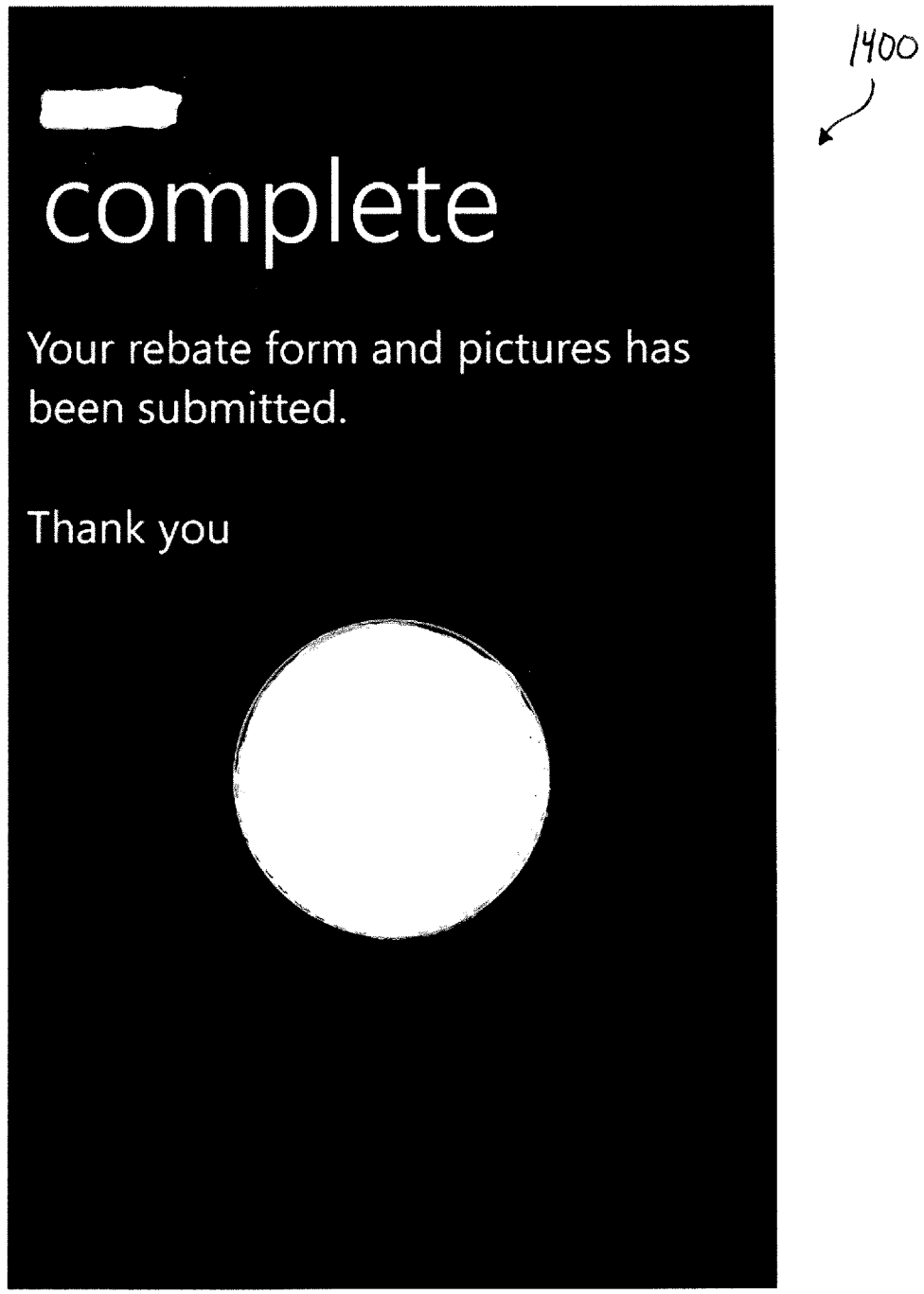
FIG. 14 illustrates an interface for confirming receipt of a rebate claim submission with validation information in accordance with another embodiment of the present disclosure.

Once the consumer has entered (or the mobile app has entered on the consumer's behalf) the required consumer information, provided any additional requested information, and uploaded the digital copy or copies of the proof of purchase data or photographed the proof of purchase data using the in-app camera function, the consumer may take some action at the digital information submission interface 1200, such as but not limited to, the actuation of a user interface button or other actuation device 1210, in order to submit the electronic or digital rebate claim. In some embodiments, the consumer may be redirected to a digital submission confirmation interface 1400, as illustrated in FIG. 14, where the consumer may be provided with a confirmation that the electronic or digital rebate claim has been submitted and any other suitable information or details as desired by the merchant or rebate processing center, such as but not limited to, information relating to a time frame for when the consumer can expect to receive the rebate, contact information, etc. In some embodiments, the digital submission confirmation interface 1400 may also reconfirm information previously entered by the consumer. As with the other interfaces, the digital submission confirmation interface 1400 may also include any other desirable information relating to the rebate program, including but not limited to, offer details, offer exclusions, valid time period for the offer, information relating to the type of submission selected, other terms and conditions, etc.

In general, the above-described embodiments for a mobile app permit a consumer to pick one or more rebate offers for redemption, provide the required consumer information, and take all necessary pictures of the proof of purchase data, and complete any other necessary consumer steps for submitting the rebate claim, all within the confines of the mobile app. No further action on the part of the consumer need be required outside of the mobile app.

Moving to step 140 in FIG. 1, upon receipt of the rebate claim, in some embodiments, the rebate processing center may verify that the rebate claim corresponds to a valid qualifying purchase. Validating rebate claims may be done in any manner known in the art, and no particular method of validation is particular to the system and method of the present disclosure. In one embodiment, a rebate processing employee may manually validate the rebate claim. In a further embodiment, the rebate processing employee may validate the rebate claim by, for example, verifying the items purchased qualify for a rebate offer, verifying the purchase was made during the qualifying time period, if any, and/or verifying other purchase details, such as number of items purchased, valid receipt information, etc., to be sure that the rebate claim meets initial criteria. In another embodiment, the rebate processing center may employ computerized hardware and/or software components that automate validation of the rebate claims, such as by automatically verifying the items purchased qualify for a rebate offer, verifying the purchase was made during the qualifying time period, if any, and/or verifying other purchase details, such as number of items purchased, valid receipt information, etc. In some embodiments, the computerized components may include image processing hardware and/or software components to assist in validation of the digital copies of the submitted proof of purchase data. An advantage of embodiments where the rebate claim has been submitted by the consumer with an electronic or digital copy or copies of proof of purchase data is that relatively accurate and efficient validation may be done by the rebate processing center without a communication link with the merchant or point-of-sale data processing systems and without overburdening consumers by subsequent mailing of proof of purchase information. Furthermore, embodiments where the rebate claim has been submitted by the consumer with an electronic or digital copy or copies of proof of purchase data, such as via a website or mobile app, as described above, is that relatively accurate and efficient validation may be done substantially immediately or in real-time upon submission of the rebate claim via the website or mobile app.

Any combination of consumer identifying information, such as name, address, e-mail address, and the like and purchase identifying information, such as purchase location, purchase date, purchase item, and the like may further be used to validate the rebate claim. In one embodiment, the rebate processing center may use particular "indicators" or a combination of particular "indicators" obtained from the consumer identifying information and/or proof of purchase data to validate the rebate claim. An indicator, as that term is used herein, in addition to any standard dictionary definitions, is meant to refer to a subset of the consumer identifying information and/or purchase identifying information. Additionally or alternatively, the rebate processing center may contact the merchant to verify that a qualifying purchase was made. The preceding examples of validation methods are meant only to provide examples of particular embodiments. The systems and methods of the present disclosure contemplate any form of validating a rebate claim. Similarly, the rebate processing center may bypass validation, or validation may be performed by another entity in lieu of the rebate processing center.

The rebate processing center may similarly check the rebate claims for fraud, for example, by comparing the name and address of the consumer to known databases containing consumer identities that may be suspicious or have previously been determined to act fraudulently. However, it is recognized that any combination of consumer identifying information, such as name, address, e-mail address, and the like and purchase identifying information, such as purchase location, purchase date, purchase item, and the like may further be used to check the rebate claim for fraud. As indicated above, in one embodiment, the rebate processing center may use particular "indicators" or combinations of particular "indicators" obtained from the consumer identifying information and/or proof of purchase data to check the rebate claim for fraud. In other embodiments the fraud-checking step may be performed by an entity other than the rebate processing center or may be omitted entirely.

At step 150, in response to the rebate claim, and upon appropriate processing and/or validation, the consumer may receive the value of the rebate, which may be transferred to the consumer in a variety of forms, including but not limited to, a rebate check, a pre-paid rebate card, an electronic rebate check or rebate gift card, or e-rebate, a value credited or uploaded to a consumer's value account, such as but not limited to a bank account, debit card account, or reloadable card account, etc. Similarly, the term value may generally be used herein as including a monetary amount in dollars or other currency, "points" or "credit" in a consumer loyalty program of a merchant, merchant association, or other association, or any other denomination of value which may be used to provide a rebate to a consumer. In some embodiments, such as but not limited to those embodiments where the rebate claim has been submitted by the consumer with an electronic or digital copy or copies of proof of purchase data, such as via a website or mobile app and validation is performed substantially immediately or in real-time upon submission of the rebate claim via the website or mobile app, the rebate value may be transferred electronically to the consumer through the website or mobile app. In some embodiments, a consumer who has received the value electronically back to a mobile device may utilize the rebate value, or e-rebate, at participating merchants by displaying the e-rebate on the consumer's mobile device for viewing or scanning, or otherwise submitting the e-rebate via a network if, for example, a purchase is made online utilizing the consumer's mobile device.

Pre-paid rebate cards shall include any debit or credit card, including Visa®, Mastercard®, Discover®, American Express®, or other credit card, loyalty card, smartcard, scannable device, or other card or device suitable for storing information relating to a pre-paid rebate card or rebate offer, and in some embodiments, may be reusable or "reloadable." A pre-paid rebate card may offer several benefits to the consumer. A pre-paid rebate card may be easier to use than a rebate check. Additionally, in some embodiments, a pre-paid rebate card may be configured to allow the consumer to use the rebate card at generally any location that accepts payment by credit rather than only the initial merchant that offered the rebate. Furthermore, an unbanked consumer can avoid the hassle associated with cashing a rebate check at a financial institution, where, for instance, they might be charged a fee.

In some embodiments, a financial institution may be enlisted or contracted for issuing the pre-paid rebate cards. Additionally, the financial institution may fulfill payment obligations upon consumer use of the pre-paid rebate card. Further details of one embodiment of a system and method for providing pre-paid rebate cards in response to a rebate claim are disclosed in U.S. application Ser. No. 13/293,587, titled "System and Method for Providing a Pre-Paid Rebate Card," filed on Nov. 10, 2011, which is hereby incorporated herein by reference in its entirety.

As briefly indicated above, in some embodiments, the merchant may have an electronic kiosk or ATM associated therewith. The merchant may sell products that qualify a purchasing consumer to receive a rebate on such products, and upon purchase of a qualifying product, the merchant may provide the consumer with rebate information, which may be in the form of one or more rebate documents. The consumer may then use the kiosk or ATM associated with the merchant to submit a rebate claim, using the rebate information. It is recognized that such kiosk or ATM may be used to provide the above described embodiments of rebate submission. In addition, such kiosk or ATM may use automated validation methods to provide quick, substantially or relatively instant, or near instant validation and/or dispense of the rebate value. Further details of one embodiment of a system and method for submitting a rebate claim via a kiosk are disclosed in U.S. application Ser. No. 13/007,919, titled "System and Method for Providing a Rebate Card From a Kiosk," filed on Jan. 17, 2011, which is hereby incorporated herein by reference in its entirety.

After receipt of the rebate value, in any suitable form such as those discussed above, the consumer may consume the rebate value by using the rebate value to purchase goods or services, as shown at step 160. In some embodiments, the rebate value may only be used at one or more locations of the merchant that offered the rebate. In other embodiments, the rebate value may be used at one or more locations, which may or may not include the locations of the merchant that offered the rebate. In some embodiments, such as where a pre-paid card having the rebate value is issued to the consumer or where a stored value account is incremented with the rebate value or where a mobile app stores one or more e-rebates, alone or in combination, the rebate value may be used at any merchant that accepts such payment types, such as payment by credit, including the merchant that offered the initial rebate and/or optionally other outside merchants. In some embodiments, the consumer may use the pre-paid rebate card, stored value account, or e-rebate a plurality of times until the value of the pre-paid rebate card, stored value account, or e-rebate has been substantially or completely used. For example, the consumer may make multiple transactions at multiple locations using the same pre-paid rebate card, stored value account, or e-rebate. A pre-paid rebate card may be, or may be similar to, a credit card, such that the pre-paid rebate card may be swiped in a credit card scanning device at the time of purchase and the pre-paid rebate card information may be automatically entered into the point-of-sale data processing and storage system. Alternatively, a pre-paid rebate card may contain a unique number, such as a credit card number, that an operator may manually enter into the point-of-sale data processing and storage system.

In addition to rebate claim validation, the rebate processing center may provide further services for the merchant, including but not limited to, providing issuance and fulfillment responsibilities for pre-paid rebate cards, rebate processing or other processing, customer service, etc. For example, the rebate processing center may take customer service inquiries or telephone calls relating to problems during issuance of the rebate, problems during use of the rebate, other inquiries, etc. In some embodiments, the rebate processing center may be a direct contact point for the merchant and provide the consumers of the merchant with rebate and fulfillment services. In one embodiment, the rebate processing center may contract out some or all services to other entities.

Although the present disclosure has been described with reference to preferred embodiments, persons skilled in the art will recognize that changes may be made in form and detail without departing from the spirit and scope of the disclosure. For example, it is recognized that multiple embodiments of rebate validation or other rebate processing may be suitable for use with the systems and methods of the present disclosure.

We claim:

1. A system for rebate claim submission over an electronic network subsequent to a qualifying transaction in which a consumer purchased a rebate qualifying product or service from a merchant and received a point-of-sale receipt including proof of purchase data, the qualifying transaction qualifying the consumer for a rebate offer made prior to the qualifying transaction, the rebate corresponding to at least a portion of a price associated with the rebate qualifying product or service purchased, the system comprising:

an electronic transactions database configured to store transaction data received from the merchant for a plurality of transactions, the transaction data comprising a transaction identifier for each of the plurality of transactions and a product identifier for the rebate qualifying product or service purchased in the qualifying transaction, the transaction identifier associated with the product identifier;

an interface downloaded to an electronic mobile device as a mobile app, wherein the interface provides access, via a uniform resource locator (URL), to a website associated with a rebate processing center that provides the interface, wherein the interface is configured to appear to be a website associated with the merchant, and wherein the interface is further configured to:

receive consumer identifying information from the consumer, the consumer identifying information comprising income, age, places the consumer typically shops, items the consumer typically purchases, or a combination thereof;

display on a display screen of the electronic mobile device a plurality of rebate offers available for selection by the consumer;

identify a selection of a one or more displayed rebate offer based on an electronic input from the consumer;

display, on the display screen, plurality of rebate fulfillment options;

receive a selection of one of the plurality of rebate fulfillment options;

provide, via the mobile app, a camera function through which the consumer captures a digital photograph of the proof of purchase data included in the point of sale receipt, the proof of purchase data indicating purchase of a rebate qualifying product or service during the qualifying transaction; and provide a digital circling function through which the consumer digitally circles the proof of purchase data in the captured digital photograph of the proof of purchase data included in the point of sale receipt; and a rebate validation processor configured to receive the captured digital photograph with the circled proof of purchase data from the consumer over the electronic network from the interface, wherein the rebate validation processor is configured to validate the rebate claim by accessing the electronic transactions database and comparing the proof of purchase data from the digital photograph received from the consumer with the product identifier associated with the transaction identifier from the stored transaction data received from the merchant.

2. The system of claim 1, wherein the proof of purchase data indicates purchase of a plurality of products or services, and wherein the point of sale receipt includes a secondary receipt.

3. The system of claim 2, wherein the proof of purchase data indicates purchase of a plurality of rebate qualifying products or services during the qualifying transaction and the transaction data comprises a product identifier for each of the plurality of rebate qualifying products or services.

4. The system of claim 1, wherein the interface is configured to store the consumer identifying information for subsequent use, and wherein the stored consumer identifying information enables bypass of one or more interfaces.

5. The system of claim 1, wherein the consumer identifying information further comprises at least one of a consumer's name, physical address, and email address.

6. The system of claim 1, wherein the proof of purchase data included in the point of sale receipt contains a Universal Product Code (UPC) for the rebate qualifying product.

7. The system of claim 1, wherein the plurality of rebate fulfillment options comprise at least checks, gift cards, and pre-paid rebate cards.

8. The system of claim 1, wherein the rebate validation processor is further configured to further validate the rebate claim based, at least in part, on the consumer identifying information.

9. A method for receiving a rebate claim, the method comprising:

storing, in an electronic transactions database, transaction data from a merchant for a plurality of transactions, the plurality of transactions comprising a qualifying transaction in which a consumer purchased a rebate qualifying product or service and received a point-of-sale receipt and including proof of purchase data for the qualifying transaction, wherein the qualifying transaction qualifies the consumer for a rebate offer made prior to the transaction, the rebate corresponding to at least a portion of a price associated with the rebate qualifying product or service purchased, the transaction data comprising a transaction identifier for each of the plurality of transactions and a product identifier for the rebate qualifying product or service purchased in the qualifying transaction, the transaction identifier associated with the product identifier;

providing, by a rebate processing center, an interface configured for downloading to an electronic mobile device as a mobile app and configured for display on a display screen of the electronic mobile device, wherein the interface provides a camera function for capturing a digital photograph of the proof of purchase data, wherein the interface provides a digital circling function for digitally circling proof of purchase data in the digital photograph of the proof of purchase data, wherein the interface provides access, via a uniform resource locator (URL), to a website associated with the rebate processing center, and wherein the interface is configured to appear to be a website associated with the merchant;

receiving, via the interface, consumer identifying information from a consumer associated with the electronic mobile device, the consumer identifying information comprising income, age, places the consumer typically shops, items the consumer typically purchases, or a combination thereof;

displaying, via the interface, a plurality of rebate offers available for selection to the consumer;

identifying a selection of a one or more displayed rebate offers based on an electronic input from the consumer;

displaying, via the interface, a plurality of rebate fulfillment options;

receiving, via the interface, a selection of one of the plurality of rebate fulfillment options;

receiving from the consumer, via the camera function provided by the interface, a digital photograph of the proof of purchase data, the proof of purchase data indicating purchase of the rebate qualifying product or service, wherein the digital photograph contains an indication of the proof of purchase data, the indication comprising digital circling; and validating the rebate, at least in part, by accessing the electronic transactions database and comparing the proof of purchase data captured by the digital photograph received via the interface from the consumer with the product identifier associated with the transaction identifier from the transaction data from the merchant.

10. The method of claim 9, wherein the consumer identifying information further comprises at least one of the consumer's name, physical address, and email address, and the proof of purchase data contains a list of at least one product or service purchased during the qualifying transaction, and a Universal Product Code (UPC).

11. The method of claim 9, wherein the plurality of rebate fulfillment options comprise at least checks, gift cards, and pre-paid rebate cards, and wherein the point of sale receipt includes a secondary receipt.

12. The method of claim 10, further comprising further validating the rebate based, at least in part, on the consumer identifying information.

13. The system of claim 1, wherein the mobile app is branded for a particular retailer, and wherein the interface is further configured to display multiple rebate offers corresponding to the particular retailer.

14. The system of claim 1, wherein the interface is further configured to display, on the display screen:
a button enabling the camera function, and wherein the camera function is included in the mobile app; and
a thumbnail of the digital photograph for verification by the consumer.

15. The system of claim 1, wherein the interface is further configured to:
compare the digital photograph to a threshold; and
instruct the consumer to capture a second digital photograph of the proof of purchase data if the digital photograph fails to satisfy the threshold.

16. The system of claim 1, wherein the rebate validation processor is further configured to:
receive the consumer identifying information from the interface; and compare the consumer identifying information to a fraudulent identities list as part of validating the rebate claim.

17. The system of claim 1, wherein the mobile app stores consumer information corresponding to multiple users.

18. The system of claim 1, wherein the interface is further configured to, after receipt of the digital photograph, display a confirmation of electronic submission of a rebate, wherein the confirmation includes an indication of a time frame associated with receiving the rebate and contact information associated with the rebate.

19. The system of claim 1, wherein the one or more rebate fulfillment options comprise an e-rebate, and wherein the e-rebate is displayable via the electronic mobile device to enable use of the e-rebate at one or more merchants.

* * * * *